United States Patent
Yang et al.

(10) Patent No.: US 12,108,337 B2
(45) Date of Patent: Oct. 1, 2024

(54) RESOURCE RESERVATION INDICATION FOR MODE 2 RESOURCE ALLOCATION WITH POWER SAVING

(71) Applicant: QUALCOMM Incorporated, San Diego, CA (US)

(72) Inventors: Wei Yang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 17/449,646

(22) Filed: Sep. 30, 2021

(65) Prior Publication Data

US 2022/0110060 A1    Apr. 7, 2022

Related U.S. Application Data

(60) Provisional application No. 63/087,148, filed on Oct. 2, 2020.

(51) Int. Cl.
*H04W 52/02* (2009.01)
*H04W 28/26* (2009.01)
*H04W 72/20* (2023.01)

(52) U.S. Cl.
CPC ....... *H04W 52/0235* (2013.01); *H04W 28/26* (2013.01); *H04W 72/20* (2023.01)

(58) Field of Classification Search
CPC . H04W 52/0235; H04W 28/26; H04W 72/20; H04W 88/04; H04W 92/18; H04W 76/28; Y02D 30/70
See application file for complete search history.

(56) References Cited

U.S. PATENT DOCUMENTS

2021/0227604 A1    7/2021  Huang et al.
2021/0352710 A1*  11/2021  Lu ........................ H04L 5/0044
(Continued)

FOREIGN PATENT DOCUMENTS

WO    2017052451 A1    3/2017
WO    2018064477 A1    4/2018

OTHER PUBLICATIONS

International Search Report and Written Opinion—PCT/US2021/053198—ISA/EPO—Jan. 25, 2022, 15 pages.
(Continued)

*Primary Examiner* — Robert C Scheibel
(74) *Attorney, Agent, or Firm* — Procopio, Cory, Hargreaves & Savitch LLP/QUALCOMM Incorporated

(57) ABSTRACT

Apparatus, methods, and computer-readable media for facilitating a resource reservation indication for mode 2 resource allocation with power saving are disclosed herein. An example method for wireless communication at a wireless device includes mapping one or more slots of a sidelink resource reservation to physical slots based on periodic on-durations of a power saving mode for sidelink communication. The example method also includes transmitting SCI indicating the sidelink resource reservation that indicates the one or more slots. Another example method for wireless communication at a first wireless device includes receiving SCI indicating a sidelink resource reservation for a second wireless device, the SCI indicating one or more slots of the sidelink resource reservation. The example method also includes mapping the one or more slots to physical slots based on periodic on-durations of a power saving mode for sidelink communication.

34 Claims, 19 Drawing Sheets

(56) References Cited

U.S. PATENT DOCUMENTS

| | | | |
|---|---|---|---|
| 2022/0030575 A1* | 1/2022 | Farag | H04L 5/0048 |
| 2022/0110055 A1 | 4/2022 | Hosseini et al. | |
| 2022/0377709 A1 | 11/2022 | Zhao et al. | |
| 2022/0399917 A1* | 12/2022 | Shin | H04B 17/318 |
| 2022/0400527 A1 | 12/2022 | Yoon | |
| 2023/0024646 A1 | 1/2023 | Park et al. | |
| 2023/0066041 A1 | 3/2023 | Guo et al. | |

OTHER PUBLICATIONS

VIVO: "Resource Allocation for Sidelink Power Saving", 3GPP TSG RAN WG1 #102-e, 3GPP Draft, R1-2005403, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020 (Aug. 8, 2020), 6 pages, XP051917428, URL: https://www.3gpp.org/ftp/tsg_ran/WG1_RL1/TSGR1_102-e/Docs/R1-2005403.zip, [retrieved on Aug. 8, 2020] Chapter 4. Partial sensing mechanism, Chapter 5. Power saving for V2P/D2D communication.

Intel Corporation: "Sidelink Enhancements for UE Power Saving", 3GPP TSG RAN WG1 Meeting #102-E, R1-2005896, 3rd Generation Partnership Project, Mobile Competence Centre, 650, Route Des Lucioles, F-06921, Sophia-Antipolis Cedex, France, vol. RAN WG1, No. e-Meeting, Aug. 17, 2020-Aug. 28, 2020, Aug. 8, 2020, XP051917798, 9 Pages.

3GPP TS 38.214: "3rd Generation Partnership Project, Technical Specification Group Radio Access Network, NR, Physical Layer Procedures for Data (Release 16)", 3GPP TS 38.214, V16.3.0, Sep. 2020, pp. 1-165, Sections 8.1 and Section 8.1.4.

Ericsson : "Resource Allocation Mechanisms for Power Saving", 3GPP TSG-RAN WG1 Meeting #102-e, R1-2006444, Aug. 17-28, 2020, 5 Pages.

Fujitsu : "Considerations on Partial Sensing in NR V2X", 3GPP TSG RAN WG1 #102-e, R1-2005545, Aug. 17-28, 2020, pp. 1-8.

Lenovo., et al., "Sidelink Resource Allocation for Power saving", 3GPP TSG RAN WG1 #102-e, 3GPP Draft, R1-2005839, 3rd Generation Partnership Project (3GPP), Mobile Competence Centre, 650, Route Des Lucioles, F-06921 Sophia-Antipolis Cedex, France, vol. RAN WG1, No. E-meeting, Aug. 17, 2020-Aug. 28, 2020, Aug. 7, 2020 (Aug. 7, 2020), XP051915064, 7 Pages, pp. 2-7.

OPPO: "Power Saving Mechanisms for NR SL", 3GPP Draft, R1-2006009, 3GPP TSG RAN WG1 #102-e, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 7, 2020 (Aug. 7, 2020), XP051915125, 5 Pages, Sections 1, 2.2-2.3 and 3.

VIVO: "Discussion on Sidelink DRX", 3GPP TSG RAN WG1 #102-e, 3GPP Draft, R1-2005405, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020 (Aug. 8, 2020), XP051917430, 3 Pages, pp. 1-2.

* cited by examiner

RESOURCE RESERVATION INDICATION FOR MODE 2 RESOURCE ALLOCATION WITH POWER SAVING

CROSS REFERENCE TO RELATED APPLICATION(S)

This application claims the benefit of and priority to U.S. Provisional Patent Application Ser. No. 63/087,148, entitled "RESOURCE RESERVATION INDICATION FOR MODE 2 RESOURCE ALLOCATION WITH POWER SAVING," and filed on Oct. 2, 2020, which is expressly incorporated by reference herein in its entirety.

INTRODUCTION

The present disclosure relates generally to communication systems, and more particularly, to wireless communication utilizing sidelink communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of wireless communication at a wireless device is provided. The method may include mapping one or more slots of a sidelink resource reservation to physical slots based on periodic on-durations of a power saving mode for sidelink communication. The example method may also include transmitting sidelink control information (SCI) indicating the sidelink resource reservation of the one or more slots.

In another aspect of the disclosure, an apparatus for wireless communication is provided. The apparatus may be a wireless device that includes a memory and at least one processor coupled to the memory, the memory and the at least one processor configured to map one or more slots of a sidelink resource reservation to physical slots based on periodic on-durations of a power saving mode for sidelink communication. The memory and the at least one processor may also be configured to transmit SCI indicating the sidelink resource reservation of the one or more slots.

In another aspect of the disclosure, an apparatus for wireless communication at a wireless device is provided. The apparatus may include means for mapping one or more slots of a sidelink resource reservation to physical slots based on periodic on-durations of a power saving mode for sidelink communication. The example apparatus may also include means for transmitting SCI indicating the sidelink resource reservation of the one or more slots.

In another aspect of the disclosure, a non-transitory computer-readable storage medium storing computer executable code for wireless communication at a wireless device is provided. The code, when executed, may cause a processor to map one or more slots of a sidelink resource reservation to physical slots based on periodic on-durations of a power saving mode for sidelink communication. The example code, when executed, may also cause the processor to transmit SCI indicating the sidelink resource reservation of the one or more slots.

In an aspect of the disclosure, a method of wireless communication at a first wireless device is provided. The method may include receiving SCI indicating a sidelink resource reservation for a second wireless device, the SCI indicating one or more slots of the sidelink resource reservation. The example method may also include mapping the one or more slots indicated in the sidelink resource reservation to one or more physical slots based on periodic on-durations of a power saving mode for sidelink communication.

In another aspect of the disclosure, an apparatus for wireless communication is provided. The apparatus may be a first wireless device that includes a memory and at least one processor coupled to the memory, the memory and the at least one processor configured to receive SCI indicating a sidelink resource reservation for a second wireless device, the SCI indicating one or more slots of the sidelink resource reservation. The memory and the at least one processor may also be configured to map the one or more slots indicated in the sidelink resource reservation to one or more physical slots based on periodic on-durations of a power saving mode for sidelink communication.

In another aspect of the disclosure, an apparatus for wireless communication at a first wireless device is provided. The apparatus may include means for receiving SCI indicating a sidelink resource reservation for a second wireless device, the SCI indicating one or more slots of the sidelink resource reservation. The example apparatus may also include means for mapping the one or more slots indicated in the sidelink resource reservation to one or more physical slots based on periodic on-durations of a power saving mode for sidelink communication.

In another aspect of the disclosure, a non-transitory computer-readable storage medium storing computer executable code for wireless communication at a first wireless device is provided. The code, when executed, may cause a processor to receive SCI indicating a sidelink resource reservation for a second wireless device, the SCI indicating one or more slots of the sidelink resource reservation. The example code, when executed, may also cause the processor to map the one or more slots indicated in the sidelink resource reservation to one or more physical slots based on periodic on-durations of a power saving mode for sidelink communication.

In an aspect of the disclosure, a method is provided for wireless communication at a wireless device. The example method includes applying a power saving mode for sidelink communication, the power saving mode having periodic on-durations. The example method also includes transmitting SCI indicating a sidelink resource reservation that indicates one or more slots based on the periodic on-durations of the power saving mode.

In another aspect of the disclosure, an apparatus is provided for wireless communication at a wireless device. The example apparatus includes means for applying a power saving mode for sidelink communication, the power saving mode having periodic on-durations. The example apparatus also includes means for transmitting SCI indicating a sidelink resource reservation that indicates one or more slots based on the periodic on-durations of the power saving mode.

In another aspect of the disclosure, an apparatus comprising a memory and at least one processor coupled to the memory is provided for wireless communication at a wireless device. The at least one processor is configured to apply a power saving mode for sidelink communication, the power saving mode having periodic on-durations. The example at least one processor is further configured to transmit SCI indicating a sidelink resource reservation that indicates one or more slots based on the periodic on-durations of the power saving mode.

In another aspect of the disclosure, a computer-readable medium storing computer executable code is provided for wireless communication at a wireless device. The example code, when executed by a processor, causes the processor to apply a power saving mode for sidelink communication, the power saving mode having periodic on-durations. The example code, when executed, also causes the processor to transmit SCI indicating a sidelink resource reservation that indicates one or more slots based on the periodic on-durations of the power saving mode.

In another aspect of the disclosure, a method is provided for wireless communication at a first wireless device. The example method includes applying a power saving mode for sidelink communication, the power saving mode having periodic on-durations. The example method also includes receiving SCI indicating a sidelink resource reservation for a second wireless device that indicates one or more slots based on the periodic on-durations of the power saving mode.

In another aspect of the disclosure, an apparatus is provided for wireless communication at a first wireless device. The example apparatus includes means for applying a power saving mode for sidelink communication, the power saving mode having periodic on-durations. The example apparatus also includes means for receiving SCI indicating a sidelink resource reservation for a second wireless device that indicates one or more slots based on the periodic on-durations of the power saving mode.

In another aspect of the disclosure, an apparatus comprising a memory and at least one processor coupled to the memory is provided for wireless communication at a wireless device. The at least one processor is configured to apply a power saving mode for sidelink communication, the power saving mode having periodic on-durations. The example at least one processor is further configured to receive SCI indicating a sidelink resource reservation for a second wireless device that indicates one or more slots based on the periodic on-durations of the power saving mode.

In another aspect of the disclosure, a computer-readable medium storing computer executable code is provided for wireless communication at a wireless device. The example code, when executed by a processor, causes the processor to apply a power saving mode for sidelink communication, the power saving mode having periodic on-durations. The example code, when executed, also causes the processor to receive SCI indicating a sidelink resource reservation for a second wireless device that indicates one or more slots based on the periodic on-durations of the power saving mode.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
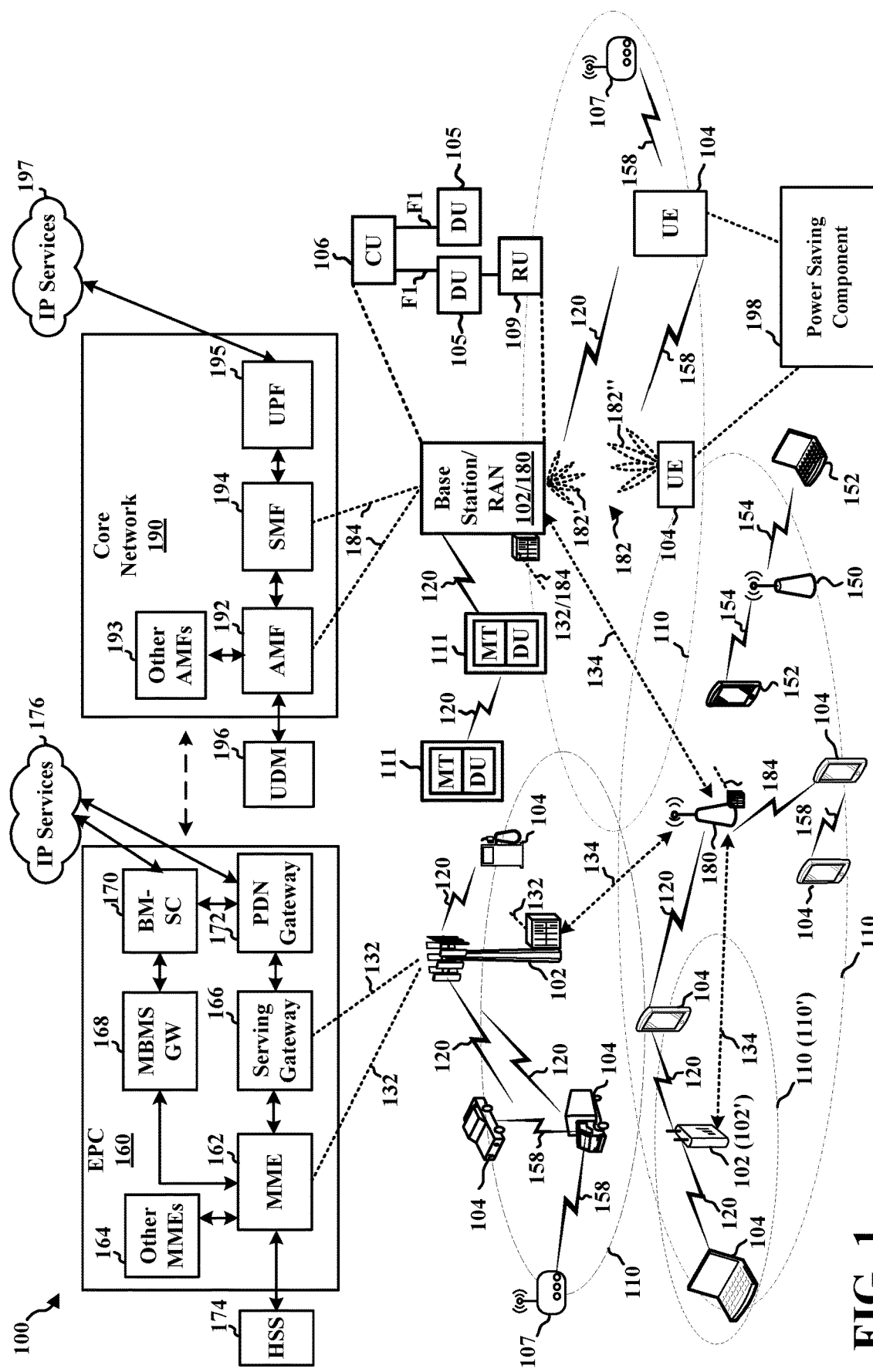
FIG. 1 is a diagram illustrating an example of a wireless communications system and an access network.

Sidelink communication enables a first UE to communicate with another UE directly. For example, the first UE and the other UE may communicate without routing the communication through a base station. For example, sidelink communication, such as vehicle-to-everything (V2X), may be used for vehicle-based communications that allows a vehicle UE to communicate directly with another UE associated with, for example, another vehicle, a road user (e.g., a pedestrian, a person on a bike, etc.), a network node, an infrastructure node, etc. Sidelink communication may also be used for non-vehicular communication.

In some aspects, sidelink communication may include power saving modes. As a non-limiting example, a sidelink device may perform aspects to conserve battery power. Sidelink devices for applications such as public safety applications, commercial applications, wearables, IoT use cases, non-vehicular applications, etc., may have less battery power than a V2X device, in some examples. In a power saving mode, sidelink communication may include periodic on durations separated by off durations. Two examples of power saving modes include partial sensing or random selection and discontinuous reception (DRX), which enable power savings by the UE skipping reception and/or sensing for periods of time. Partial sensing (e.g., resource allocation mode 2 with a partial sensing scheme) may be implemented at a physical layer of a protocol stack, and DRX may be implemented at a medium access control (MAC) layer of the protocol stack. DRX and partial sensing may include an on duration during which the UE may perform sensing/monitoring, transmission and reception over a period of time. The UE may sleep for the remainder of time, e.g., skipping reception, monitoring, or sensing during the duration outside of the on duration.

When applying the partial sensing or a random selection power saving mode, a UE may skip sensing during at least some durations of time. In random selection, the UE may randomly select resources without monitoring for resource reservations from other UEs. In partial sensing, the UE may perform sensing for resource reservations during sensing durations and skip sensing during non-sensing durations. The reduced amount of sensing for resource reservations reduces power consumption by the UE.

When applying the DRX power saving mode, a UE may wake up during a period, such as a paging occasion, to monitor for a page from the network. If the UE receives a page during the period, the UE may continue operating in an awake state until an on-duration of the DRX power saving mode expires. If no page is received during the period, the UE may transition to a sleep state or a low power mode until a next period (e.g., a subsequent paging occasion).

In some examples, a UE may operate in an awake state during some periods and may operate in a sleep state during other periods. In some examples, a UE configured with and applying a power saving mode (e.g., a partial sensing power saving mode or a DRX power saving mode), the UE may reserve resources for a future transmission that falls outside the on-duration of the UE. In some such examples, the UE may lose the resource reservation.

Aspects disclosed herein provide techniques for resource indication for a sidelink UE implementing power saving modes (e.g., a partial sensing power saving mode or a DRX power saving mode). For example, disclosed techniques enable resource reservation based on concatenated logical slot indices. For example, aspects disclosed herein facilitate a UE concatenating on-duration windows for the UE and mapping the concatenated logical slots to physical slots. For example, the UE may concatenate the on-duration windows for the UE and generate a mapping of the concatenated ON-duration windows to logical slots.

Aspects disclosed herein may generate a mapping of physical slots to logical slots. For example, when a UE applies a power saving mode, the UE may be configured with an on and off pattern corresponding to periods during which the UE operates in the awake state and the sleep state, respectively. During the on duration of the pattern, the UE may operate in the awake state by monitoring for communication, sensing, receiving communication, and/or transmitting communication. During the off duration, the UE may enter the sleep state in which the UE skips monitoring, reception, transmission, and/or sensing. The duration of the periods may correspond to physical slots, in some aspects. For example, the on and off pattern may indicate that the UE operates in the awake state for a first on-duration window corresponding to ten physical slots of a resource pool (e.g., physical slots 0 to 9), operates in the sleep state for an off-duration window corresponding to ten physical slots of the resource pool (e.g., physical slots 10 to 19), and operates in the awake state for a second on-duration window corresponding to ten physical slots of the resource pool (e.g., physical slots 20 to 29). The UE may concatenate the resources associated with the on-duration windows (e.g., the physical slots 0 to 9 and 20 to 29) to form a logical slot resource pool (e.g., a logical resource pool including the slots corresponding to the on-durations) comprising logical slots n to n+19. Thus, the logical slot resource pool may exclude resources associated with the off-duration window (e.g., the physical slots 10 to 19). The UE may then map the resources of the logical slot resource pool to the physical slots of the resource pool. For example, the UE may map the logical slots n to n+9 of the logical slot resource pool to the physical slots 0 to 9 of the resource pool and may map the logical slots n+10 to n+19 of the logical slot resource pool to the physical slots 20 to 29 of the resource pool. When a transmitting UE performs resource reservation, the transmitting UE may indicate the resources using logical slot indices of the logical slot resource pool. When a UE receives a resource reservation including the logical slot indices, the receiving UE may use the mapping to determine the physical slots of the resource pool corresponding to the logical slot indices to determine which resources the transmitting UE is reserving. The use of the resource reservation including the logical slot indices enables the UE to indicate resources in a more efficient manner by providing an indication that corresponds to the on-durations of the UE. For example, the resource reservation may be more efficient by not addressing the intervening resources that do not correspond to an on-duration of the UE.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. In some examples, an intermediary device (e.g., such as a base station 102 or 180) may facilitate communication between an originating device (e.g., a first UE) and a target device (e.g., a second UE) using sidelink communication. For example, a base station may allocate resources for sidelink communication, in some examples. In other examples, the devices may communicate without assistance from an intermediary device.

Figure 2:
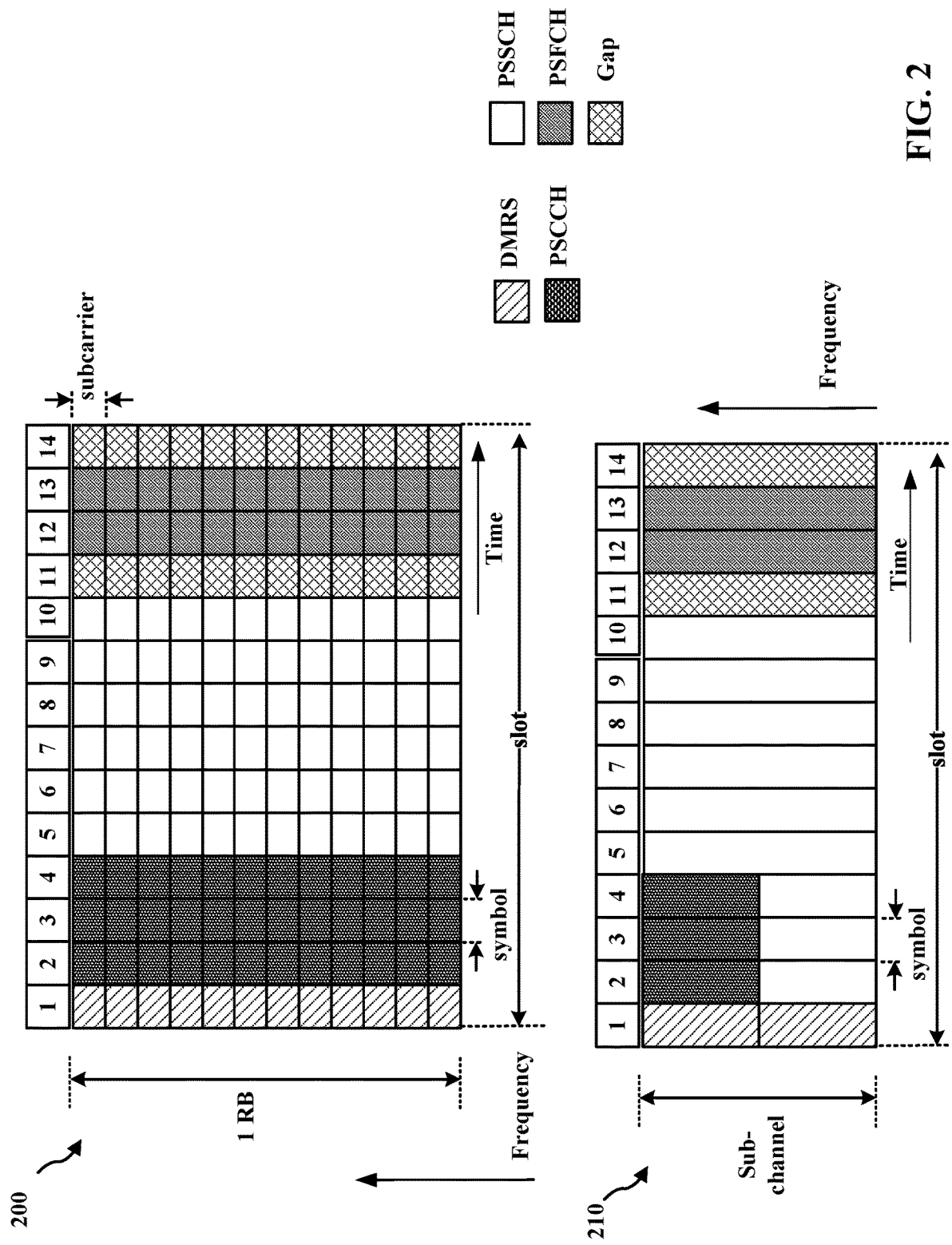
FIG. 2 illustrates example aspects of a sidelink slot structure.

Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in some aspects, a sidelink communication device, such as the UE 104, may be configured to manage one or more aspects of wireless communication by facilitating resource reservation for UEs applying a power saving mode. As an example, in FIG. 1, the UE 104 may include a power saving component 198 configured to map one or more slots of a sidelink resource reservation to physical slots based on periodic on-durations of a power saving mode for sidelink communication. The example power saving component 198 may also be configured to transmit SCI indicating the sidelink resource reservation of the one or more slots.

In some aspects, the UE 104 may include the power saving component 198 configured to apply a power saving mode for sidelink communication, the power saving mode having periodic on-durations. The example power saving component 198 may also be configured to transmit SCI indicating a sidelink resource reservation that indicates one or more slots based on the periodic on-durations of the power saving mode.

Still referring to FIG. 1, a receiving UE 104 may similarly include a power saving component 198 configured to receive SCI indicating a sidelink resource reservation for a second wireless device, the SCI indicating one or more slots of the sidelink resource reservation. The example power saving component 198 of each UE may also be configured to map the one or more slots to one or more physical slots based on periodic on-durations of a power saving mode for sidelink communication.

In some aspects, the receiving UE 104 may include the power saving mode component 1944 configured to apply a power saving mode for sidelink communication, the power saving mode having periodic on-durations. The example power saving component 198 of each UE may also be configured to receive SCI indicating a sidelink resource reservation for a second wireless device that indicates one or more slots based on the periodic on-durations of the power saving mode.

Although the following description provides examples directed to 5G NR (and, in particular, to sidelink communications via 5GNR), the concepts described herein may be applicable to other similar areas, such as LTE, LTE-A, CDMA, GSM, and/or other wireless technologies, in which wireless communication devices may employ power saving modes and perform resource reservations.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., an Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols may be CP orthogonal frequency division multiplexing (OFDM) (CP-OFDM) symbols. The symbols may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>$\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIG. 2 provides an example of normal CP with 14 symbols per slot. Within a set of frames, there may be one or more different bandwidth parts (BWPs) that are frequency division multiplexed. Each BWP may have a particular numerology and CP (normal or extended).

Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
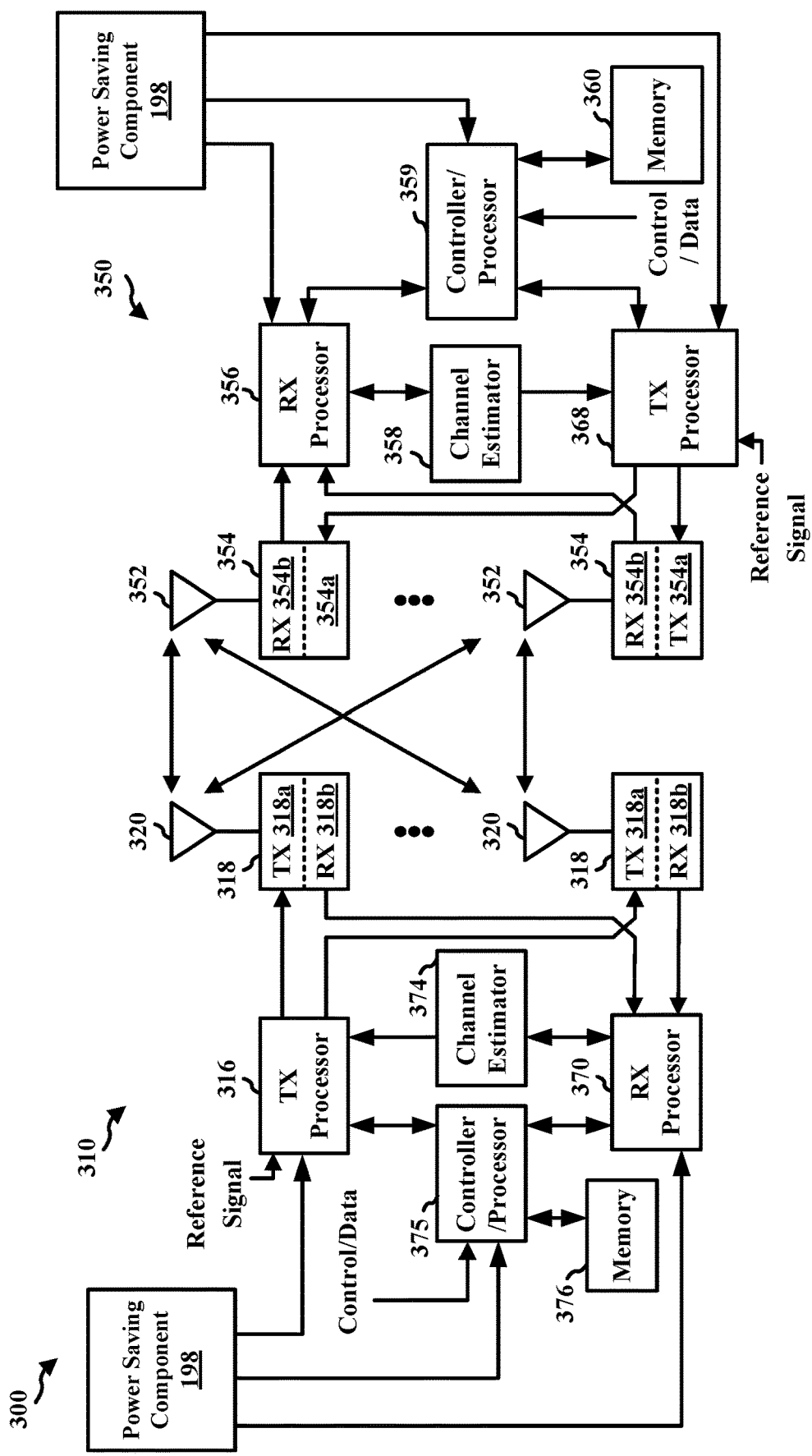
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350. The communication may be based on sidelink or an access link. In some examples, the wireless communication devices 310, 350 may communicate based on V2X or other D2D communication. In other aspects, the wireless communication devices 310, 350 may communicate over an access link based on uplink and downlink transmissions. The communication may be based on sidelink using a PC5 interface (e.g., between two UEs). The communication may be based on an access link using a Uu interface (e.g., between a base station and a UE). The wireless communication devices 310, 350 may comprise a UE, an RSU, a base station, etc. In some implementations, the first wireless communication device 310 may correspond to a base station and the second wireless communication device 350 may correspond to a UE.

As shown in FIG. 3, the first wireless communication device 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example second wireless communication device 350 includes antennas 352, a transceiver 354 including a transmitter 354a and a receiver 354b, an RX processor 356, a channel estimator 358, a controller/processor 359, memory 360, and a TX processor 368. In other examples, the first wireless communication device 310 and/or the second wireless communication device 350 may include additional or alternative components.

Packets may be provided to the controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the second wireless communication device 350. Each spatial stream may then be provided to a different antenna 320 via a separate transmitter 318a. Each transmitter 318a may modulate a radio frequency (RF) carrier with a respective spatial stream for transmission.

At the second wireless communication device 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the second wireless communication device 350. If multiple spatial streams are destined for the second wireless communication device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the first wireless communication device 310. These soft decisions may be based on channel estimates computed by the channel estimator 358. The soft decisions are then decoded and deinterleaved to recover the data and control signals that were originally transmitted by the first wireless communication device 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by the first wireless communication device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the first wireless communication device 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The transmission is processed at the first wireless communication device 310 in a manner similar to that described in connection with the receiver function at the second wireless communication device 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368 or the TX processor 316, the RX processor 356 or the RX processor 370, and the controller/processor 359 or the controller/processor 375 may be configured to perform aspects in connection with the power saving component 198 of FIG. 1.

Figure 4:
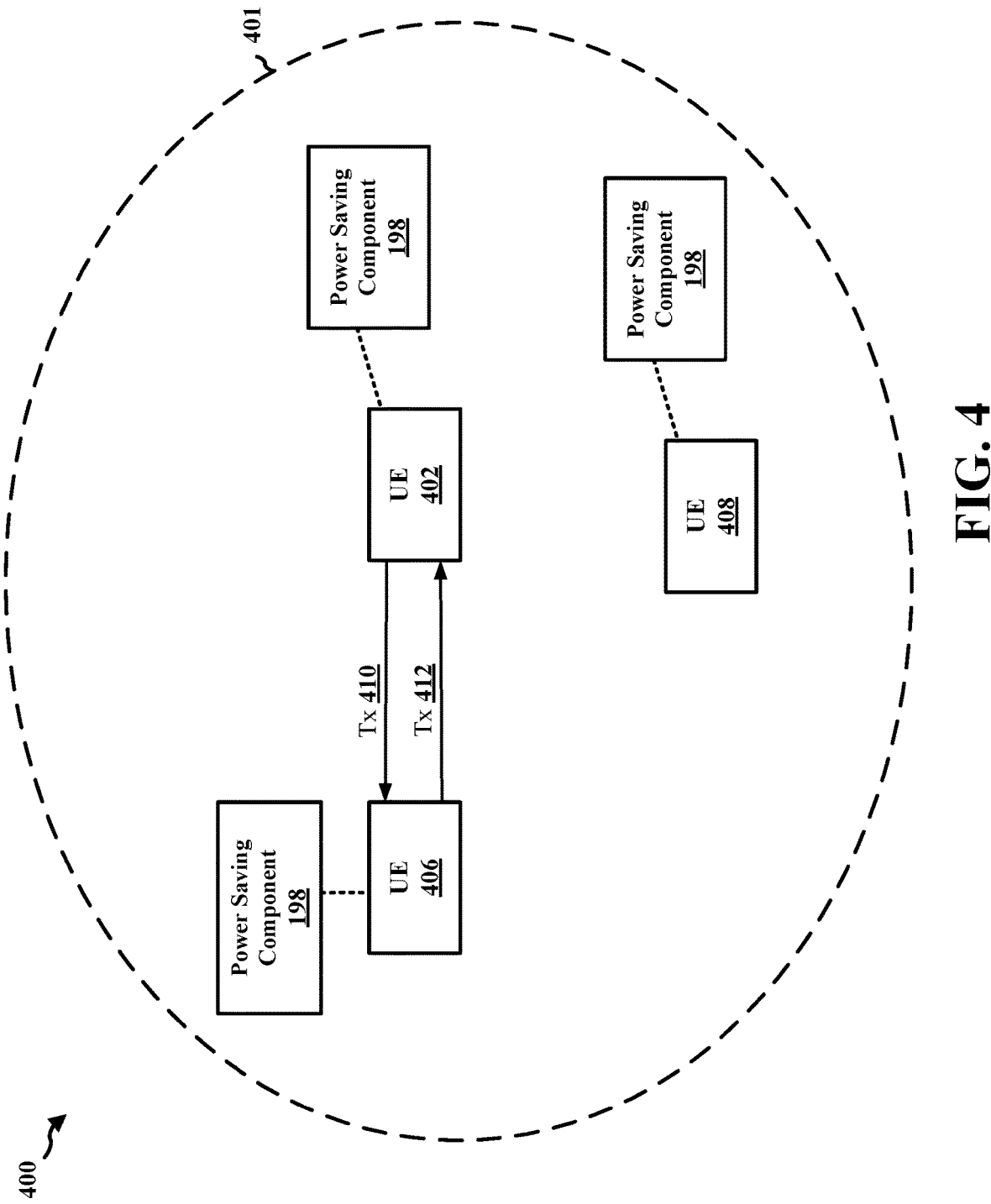
FIG. 4 illustrates example aspects of sidelink communication between devices, in accordance with aspects presented herein.

FIG. 4 illustrates an example 400 of sidelink communication between devices, as presented herein. The communication may be based on a slot structure comprising aspects described in connection with FIG. 2 or another sidelink structure. For example, a first UE 402 may transmit a sidelink transmission 410, e.g., comprising a control channel (e.g., PSCCH) and/or a corresponding data channel (e.g., PSSCH), that may be received by a second UE 406 and/or a third UE 408. The sidelink transmission 410 may be received directly from the first UE 402, e.g., without being transmitting through a base station.

The first UE 402, the second UE 406, and/or the third UE 408 may each be capable of operating as a transmitting device in addition to operating as a receiving device. Thus, the second UE 406 is illustrated as transmitting a sidelink transmission 412 that is received by the first UE 402. One or more of the sidelink transmissions 410, 412 may be broadcast or multicast to nearby devices. For example, the first UE 402 may transmit communications intended for receipt by other UEs within a range 401 of the first UE 402. In other examples, one or more of the sidelink transmissions 410, 412 may be groupcast to nearby devices that are a member of a group. In other examples, one or more of the sidelink transmissions 410, 412 may be unicast from one UE to another UE.

A sidelink transmission may provide sidelink control information (SCI) including information to facilitate decoding the corresponding data channel. For example, a transmitting device (sometimes referred to as an "originating device," a "transmitting UE", or an "originating UE") may transmit SCI including information that a receiving device (sometimes referred to as a "target device," a "receiving UE," or a "target UE") may use to avoid interference. For example, the SCI may indicate reserved time resources and/or reserved frequency resources that will be occupied by the data transmission, and may be indicated in a control message from the transmitting device. The number of TTIs, as well as the RBs that will be occupied by the data transmission, may be indicated in a control message from the first UE 402. In some examples, the SCI may be used by a receiving device to avoid interference by refraining from transmitting on the occupied resources during a data transmission.

One or more of the first UE 402, the second UE 406, and/or the third UE 408 may include a power saving component, similar to the power saving component 198 described in connection with FIG. 1.

Sidelink communication enables a first UE to communicate with another UE directly. For example, the first UE and the other UE may communicate without routing the communication through a base station. Sidelink may be beneficial for vehicle-based communications (e.g., V2V, V2I, V2N, V2P, C-V2X, etc.) that allows a vehicle UE to communicate directly with another UE or a pedestrian UE. When dealing with V2X communication, power consumption by the vehicle UE might not be a concern.

However, it may be beneficial to implement power saving modes for non-vehicular applications of sidelink or for some vehicular applications. Two examples of power saving modes include partial sensing or random selection and discontinuous reception (DRX). Partial sensing may be implemented at the physical layer of the protocol stack, and DRX may be implemented at the MAC layer of the protocol stack.

Sidelink communication may be based on different types or modes of resource allocation mechanisms. In a first resource allocation mode (which may be referred to herein as "Mode 1"), centralized resource allocation may be provided by a network entity. For example, and referring to the example of FIG. 1, a base station 102/180 may determine resources for sidelink communication and may allocate resources to different UEs to use for sidelink transmissions.

In this first mode, a UE receives the allocation of sidelink resources from the base station 102/180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots.

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether a selected sidelink resource has been reserved by other UE(s) before selecting the sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 5:
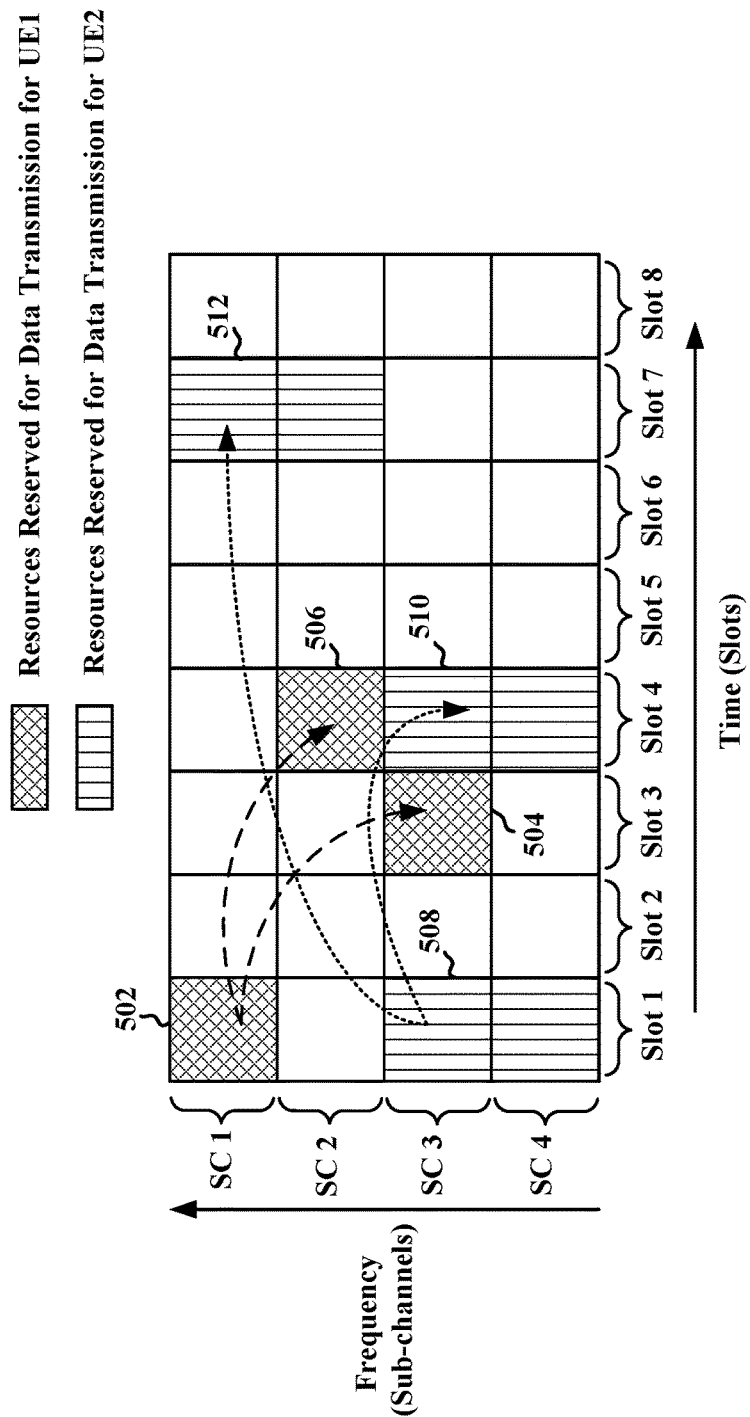
FIG. 5 illustrates examples of resource reservation for sidelink communication.

FIG. 5 is an example 500 of time and frequency resources showing reservations for sidelink transmissions, as presented herein. The resources may be comprised in a sidelink resource pool, for example. The resource allocation for each UE may be in units of one or more sub-channels in the frequency domain (e.g., sub-channels SC1 to SC 4), and may be based on one slot in the time domain (e.g., slots 1 to 8). The UE may also use resources in the current slot to perform an initial transmission, and may reserve resources in future slots for retransmissions. In the illustrated example of FIG. 5, two different future slots are being reserved by UE1 and UE2 for retransmissions. The resource reservation may be limited to a window of a pre-defined slots and sub-channels, such as an 8 time slots by 4 sub-channels window as shown in example 500, which provides 32 available resource blocks in total. This window may also be referred to as a resource selection window.

A first UE ("UE1") may reserve a sub-channel (e.g., SC 1) in a current slot (e.g., slot 1) for its initial data transmission 502, and may reserve additional future slots within the window for data retransmissions (e.g., a first data retransmission 504 and a second data retransmission 506). For example, the first UE may reserve sub-channels SC 3 at slot 3 and SC 2 at slot 4 for future retransmissions as shown by FIG. 5. The first UE then transmits information regarding which resources are being used and/or reserved by it to other UE(s). The first UE may do so by including the reservation information in a reservation resource field of the SCI, e.g., a first stage SCI.

FIG. 5 illustrates that a second UE ("UE2") reserves resources in sub-channels SC 3 and SC 4 at slot 1 for a current data transmission 508, reserves a first data retransmission 510 at slot 4 using sub-channels SC 3 and SC 4, and reserves a second data retransmission 512 at slot 7 using sub-channels SC 1 and SC 2, as shown by FIG. 5. Similarly, the second UE may transmit the resource usage and reservation information to other UE(s), such as using the reservation resource field in SCI.

A third UE may consider resources reserved by other UEs within the resource selection window to select resources to transmit its data. The third UE may first decode SCIS within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 5 illustrates resources being reserved for an initial transmission and two retransmissions, the reservation may be for an initial transmission and a single transmission or only for an initial transmission.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 5, the second UE may transmit SCI reserving resources for the current data transmission 508, the first data retransmission 510, and the second data retransmission 512.

There may be a timeline for a sensing-based resource selection. For example, the UE may sense and decode the SCI received from other UEs during a sensing window, e.g., a time duration prior to resource selection. Based on the sensing history during the sensing window, the UE may be able to maintain a set of available candidate resources by excluding resources that are reserved by other UEs from the set of candidate resources. A UE may select resources from its set of available candidate resources and transmits SCI reserving the selected resources for sidelink transmission (e.g., a PSSCH transmission) by the UE. There may be a time gap between the UE's selection of the resources and the UE transmitting SCI reserving the resources.

Figure 6:
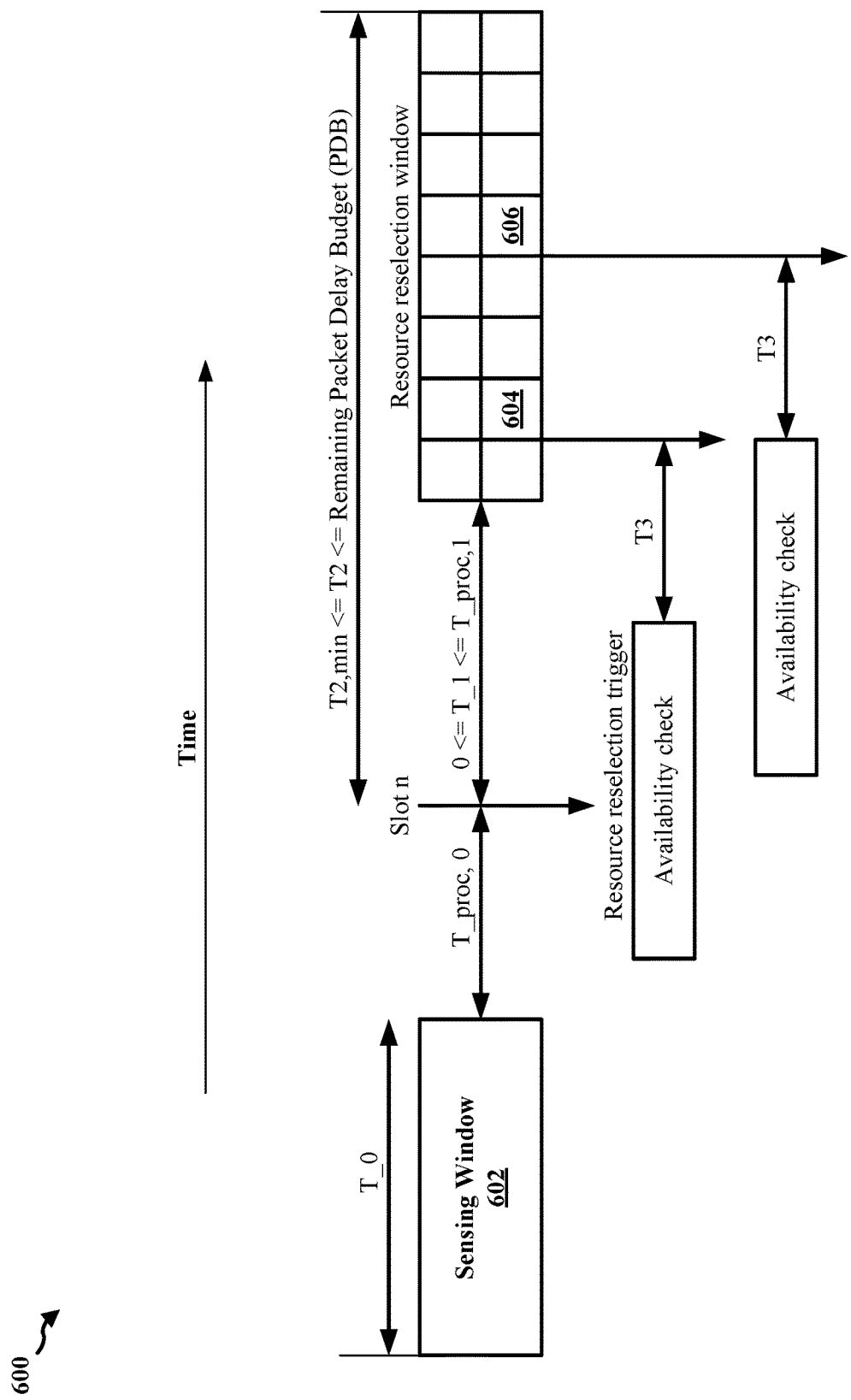
FIG. 6 is a diagram illustrating a timing diagram for a wireless device employing a partial sensing mechanism.

FIG. 6 illustrates an example timing diagram 600 for a UE that may be triggered to select a resource for sidelink transmission at slot n. The timing diagram shows a timing for sensing for resource reservations from other UEs, such as the resource reservations described in connection with FIG. 5. As an example, the trigger may include having data for transmission. Although FIG. 6 is described in connection with a UE, the resource selection may also be applied by other sidelink devices. In response to the trigger at slot n, the UE may consider signals received within a sensing window 602 of duration T_0 and determine information (e.g., SCI with resource reservations) received within the sensing window 602. For example, the UE may determine which resources were used by other UE(s) or reserved by other UE(s) during the sensing window 602. The UE may anticipate that the previously used resources may also be used by the other UE in the future (e.g., during or after slot n). A signal received in the sensing window may comprise SCI indicating a resource reservation for a resource within the resource selection window following slot n. Based on the past use of resources and/or the reservation of resources (e.g., the "sensing" of resources), the UE may determine which resources are scheduled for use and/or determine which resources are not scheduled for use. For example, based on the sensing of the resources during the sensing window 602, the UE may determine that a first resource 604 and a second resource 606 may be reserved during the slot n and/or during a future slot. The UE may exclude candidate resources that are reserved by other UEs from a candidate set of resources when selecting a sidelink transmission resource. In some examples, the UE may exclude candidate resources that are reserved by another UE and that meet one or more conditions, such as the reservation signal meeting an RSRP threshold.

Figure 7A:
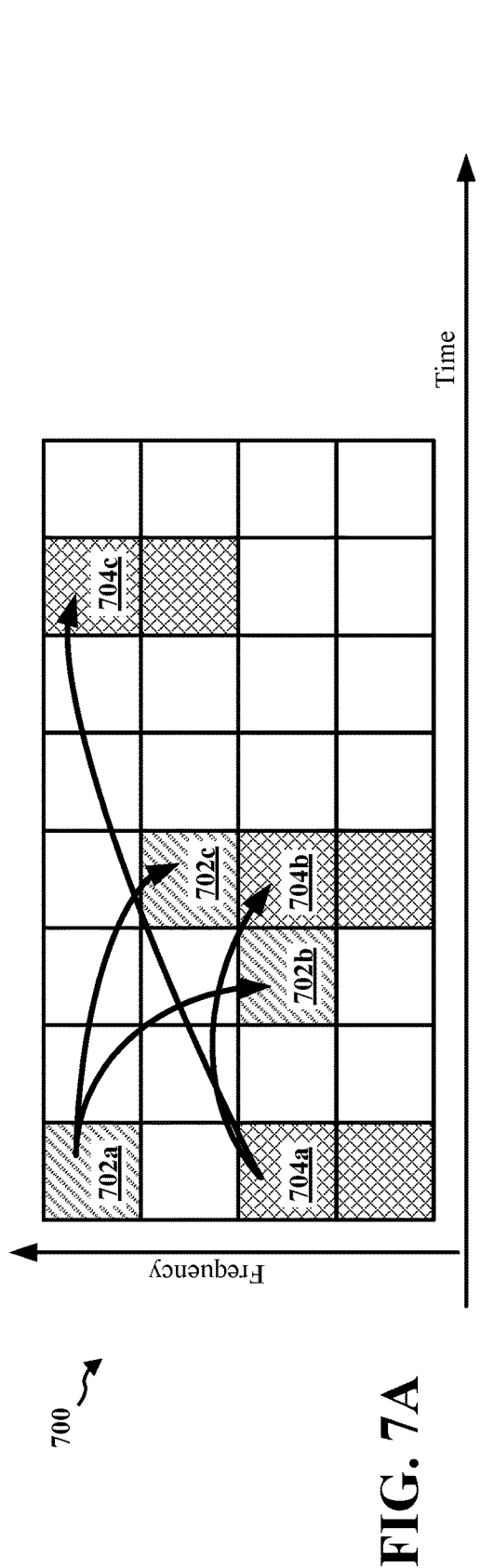
FIG. 7A is a diagram illustrating aperiodic resource reservation, in accordance with the teachings disclosed herein.

For example, resource allocation may be in units of sub-channels in the frequency domain and may be limited to one slot in the time domain. A transmission may reserve resources in the current slot and in up to two future slots. Reservation information may be carried in the SCI. Additionally; reservations may be reserved within a window of 32 slots. FIG. 7A illustrates a reservation window 700 comprising 32 slots. In the illustrated example of FIG. 7A, the reservation window 700 comprises frequency domain resources along the vertical axis and time domain resources along the horizontal axis. However, other examples may employ additional or alternative techniques for implementing the reservation window.

Resource reservations may be aperiodic resource reservations or periodic resource reservations. When implementing an aperiodic resource reservation, a UE may transmit a first packet (e.g., in a first slot 702a), the UE can also reserve up to two resources in the future (e.g., at a second slot 702b and at a third slot 702c). In another example, the UE may transmit a second packet using a resource (e.g., comprising a first combined slot 704a) and reserve up to two resources in the future (e.g., at a second combined slot 704b and at a third combined slot 704c). In the illustrated example, the resource for the transmission of the first packet and/or the second packet and the reserved resources are limited to the reservation window 700 comprising the 32 slots.

Figure 7B:
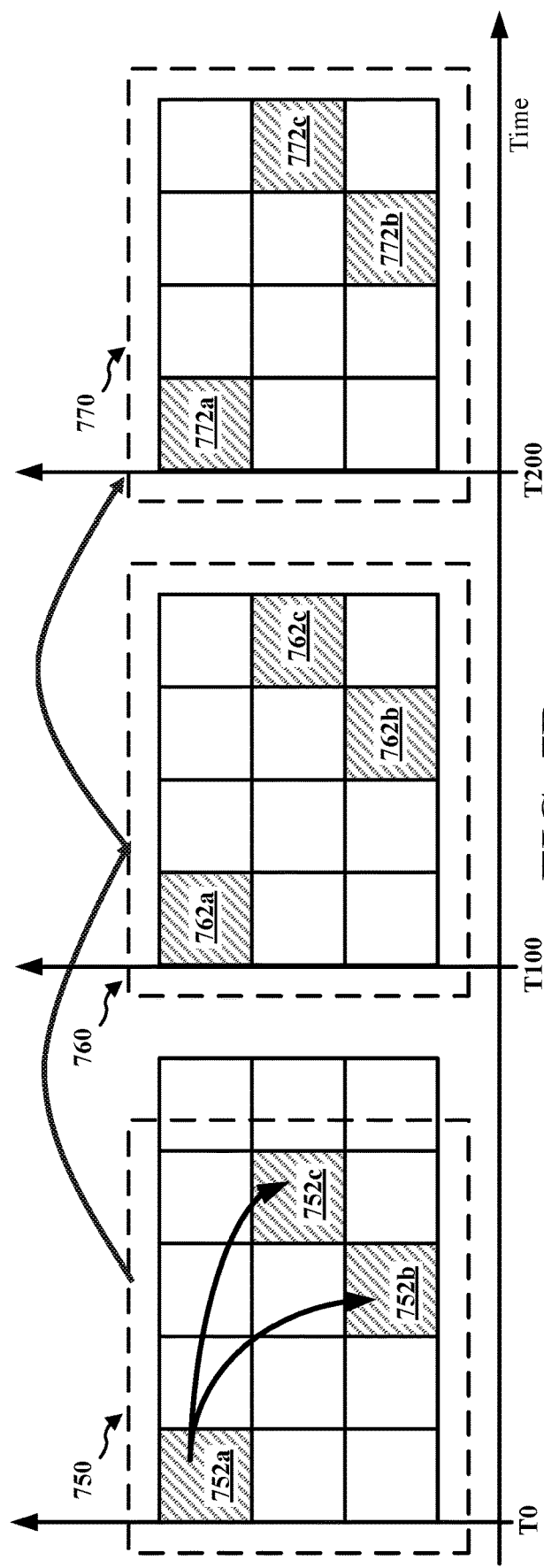
FIG. 7B is a diagram illustrating periodic resource reservation, in accordance with the teachings disclosed herein.

When implementing a periodic resource reservation, the UE may transmit a packet and also indicate a period. In some such examples, the UE may use the same resource(s) at the next period. FIG. 7B illustrates a first resources set 750, a second resources set 760, and a third resources set 770 each associated with different times. For example, at a time T0, a UE may transmit a packet using a first slot 752a of the first resources set 750. The UE may also reserve two resources in the future (e.g., at a second slot 752b and at a third slot 752c) of the first resources set 750. The UE may also transmit an indication of a period of 100 ms. In some such examples, at a time T100, a first slot 762a, a second slot 762b, and a third slot 762c of the second resources set 760 may be reserved for the UE. Similarly, at a time T200, a first slot 772a, a second slot 772b, and a third slot 772c of the third resources set 770 may be reserved for the UE.

It may be appreciated that the first slot 762a of the second resources set 760 and the first slot 772a of the third resources set 770 may correspond to the first slot 752a of the first resources set 750. Similarly, the second slot 762b of the second resources set 760 and the second slot 772b of the third resources set 770 may correspond to the second slot 752b of the first resources set 750, and the third slot 762c of the second resources set 760 and the third slot 772c of the third resources set 770 may correspond to the third slot 752c of the first resources set 750.

Figure 8A:
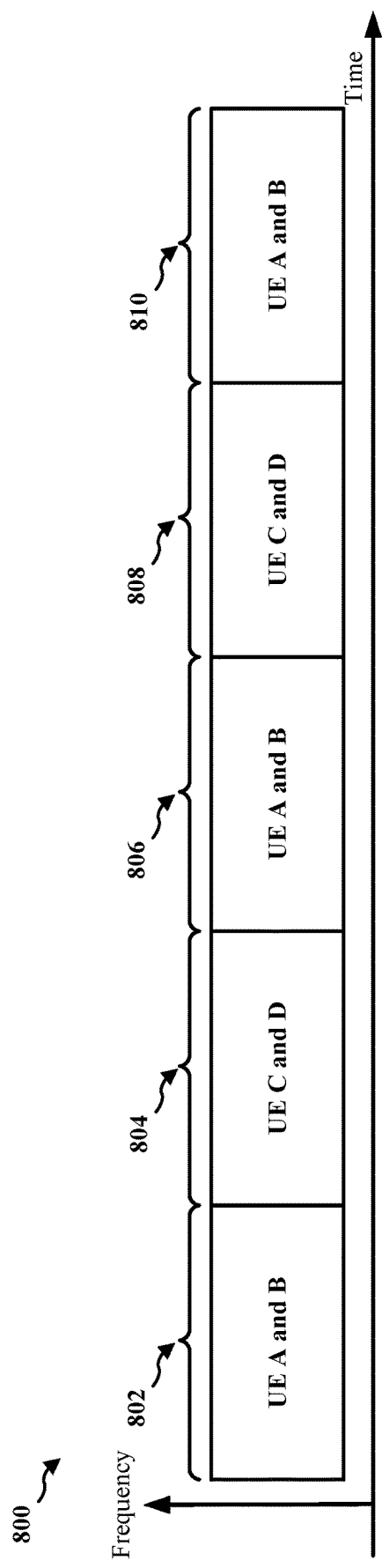
FIG. 8A is a diagram illustrating a resource pool including periodic on-durations of a power saving mode, in accordance with the teachings disclosed herein.

As mentioned above, UEs may implement power saving mechanisms to conserve power. For example, the UE may implement a partial sensing power saving mode or a DRX power saving mode. While each of the mechanisms may be implemented differently, they each provide power savings to the UE by reducing an on-duration during which the UE is awake and communicating (or available for communication). For example, the UE may operate in an awake state and perform sensing, transmission, and/or reception during an on-duration and may operate in a sleep state during the remainder of the time (e.g., during off-durations). FIG. 8A illustrates a resource pool 800 including a sequence of on-durations during which different sets of UEs are operating in the on-duration. In the illustrated example of FIG. 8A, the frequency domain is represented along a vertical axis and the time domain is represented along a horizontal axis.

As shown in FIG. 8A, one or more UEs that may communicate (e.g., using sidelink) are active during an on-duration and then go to sleep during an off-duration. For example, during a first on-duration 802, a first pair of UEs (e.g., a UE A and a UE B) may operate in an awake state to sense, reserve resources, and transmit to each other and then transition to a sleep state at the end of the first on-duration 802. During a second on-duration 804, the first pair of UEs may continue operating in the sleep state, and a second pair of UEs (e.g. a UE C and a UE D) may transition to the awake state. As shown in FIG. 8A, the first pair of UEs (e.g., the UE A and the UE B) operate in the awake state during the first on-duration 802, a third on-duration 806, and a fifth on-duration 810, and operate in the sleep state during the second on-duration 804 and the fourth on-duration 808. In a similar manner, the second pair of UEs (e.g., the UE C and the UE D) operate in the awake state during the second on-duration 804 and the fourth on-duration 808, and operate in the sleep state during the first on-duration 802, the third on-duration 806, and the fifth on-duration 810. By operating in the sleep state when not communicating, the respective UEs may conserve power.

It may be appreciated that the on-durations during which a UE is operating in an awake state may be referred to as a "partial sensing pattern" when the UE is implementing a partial sensing mechanism or may be referred to as a "DRX pattern" when the UE is implementing a DRX mechanism.

Figure 8B:
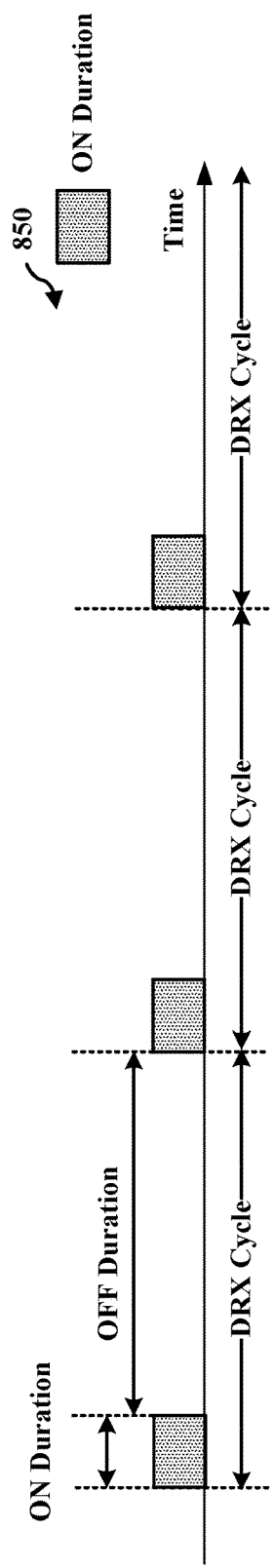
FIG. 8B illustrates example aspects of discontinuous reception (DRX), in accordance with aspects disclosed herein.

FIG. 8B illustrates an example of a DRX cycle 850. In a DRX configuration, the UE may monitor for communication in a discontinuous manner over time. For example, the UE may receive, transmit, and/or sense during an on duration (e.g., which may be referred to as a DRX ON duration), and may skip transmission, reception, or sensing during an off duration (e.g., which may be referred to as a DRX OFF duration). The UE may enter a sleep mode or a low power mode during the DRX off duration, in which the UE minimizes power consumption by shutting down a radio frequency (RF) function without detecting communication from the base station.

Figure 8C:
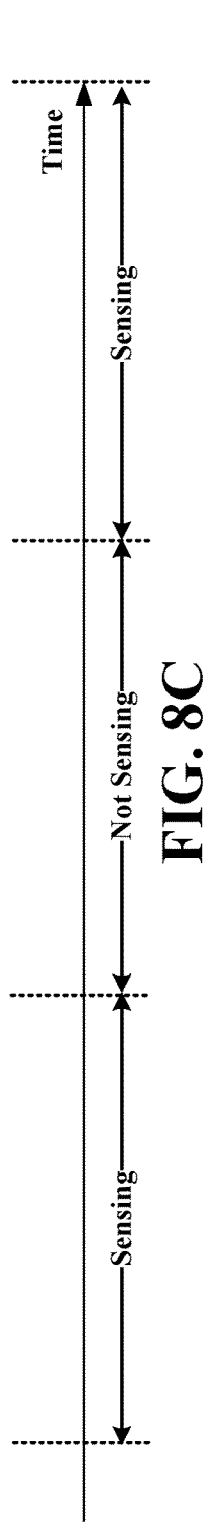
FIG. 8C illustrates example aspects of partial sensing, in accordance with aspects disclosed herein.

FIG. 8C illustrates an example of a partial sensing pattern 875 in which the UE performs sensing, e.g., as described in connection with FIG. 6, in a discontinuous manner. The UE may perform sensing during periodic durations that are separated in time by durations during which the UE may not perform sensing. Thus, the UE may perform sensing for sidelink resource reservations from other UEs during the sensing duration and may skip sensing for the sidelink resource reservations from the other UEs during the non-sensing duration.

Aspects presented herein may be based on a DRX pattern having an on duration and an off duration and may provide power saving for sidelink communications. In DRX, a UE may periodically enter a sleep state to save power or enter an awake state to monitor for and receive a PDCCH, PSCCH, or the like. The term "sensing" may refer to a procedure in which a UE monitors for resource reservations by other sidelink UEs to select resources for sidelink transmissions from unreserved resources. The term "partial sensing" may refer to a procedure in which a UE performs sensing discontinuously based on configurations (e.g., by a base station or without base station signaling). The overall time that the UE is "on", which may equal to a semi-statically configured DRX ON duration (e.g., the duration which a UE is to stay on based on the DRX configuration) plus a dynamically extended time, may be referred to as a DRX active duration. For example, a UE may be awake during a configured duration where the UE monitors for PDCCH or PSCCH, and the UE may be additionally awake in an extended period of time based on one or more timers or one or more transmissions (such as DCI or SCI) between the UE and another entity, such as a UE or a base station. As an example, if the UE receives a PSCCH indicating a new sidelink transmission or a retransmission to be received outside of the UE's DRX ON duration, the UE's awake time may be extended. The one or more timers may include an inactivity timer or a hybrid automatic repeat request (HARD) round trip time (RTT). As used herein, the term "on duration" or "on-duration" may refer to a DRX ON duration (e.g., a configured duration based on a DRX configuration where a UE monitors for PDCCH, PSCCH, or the like) or a DRX active duration (e.g., a duration where a UE is awake, which may include the duration where a UE monitors for a channel such as a PDCCH or a PSCCH, a duration where a UE is receiving a PDCCH or a PSCCH, and a duration where the UE has not fell asleep due to one or more transmissions) and the term "off duration" or "off-duration: may refer to a DRX OFF duration (e.g., a duration where a UE is not in the configured duration to monitor for PDCCH) or a DRX inactive duration (e.g., a duration where a UE is not in the active duration).

In some examples, the resources of the resources pool may be defined for synchronization purposes using a global power saving pattern (e.g., a "system-wide" DRX pattern or a "system-wide" partial sensing pattern). For example, the global power saving pattern may define the one or more resources during which the first pair of UEs are to operate in the awake state (e.g., the first on-duration 802, the third on-duration 806, and the fifth on-duration 810 for the UE A and the UE B). In some such examples, the global power saving pattern may define the one or more resources during which the second pair of UEs are to operate in the awake state (e.g., the on-durations for the UE C and the UE D) to be the same as the on-durations for the first pair of UEs (e.g., the first on-duration 802, the third on-duration 806, and the fifth on-duration 810) or to be orthogonal to the on-durations for the first pair of UEs (e.g., the on-durations second pair of UEs may be the second on-duration 804 and the fourth on-duration 808).

Figure 9:
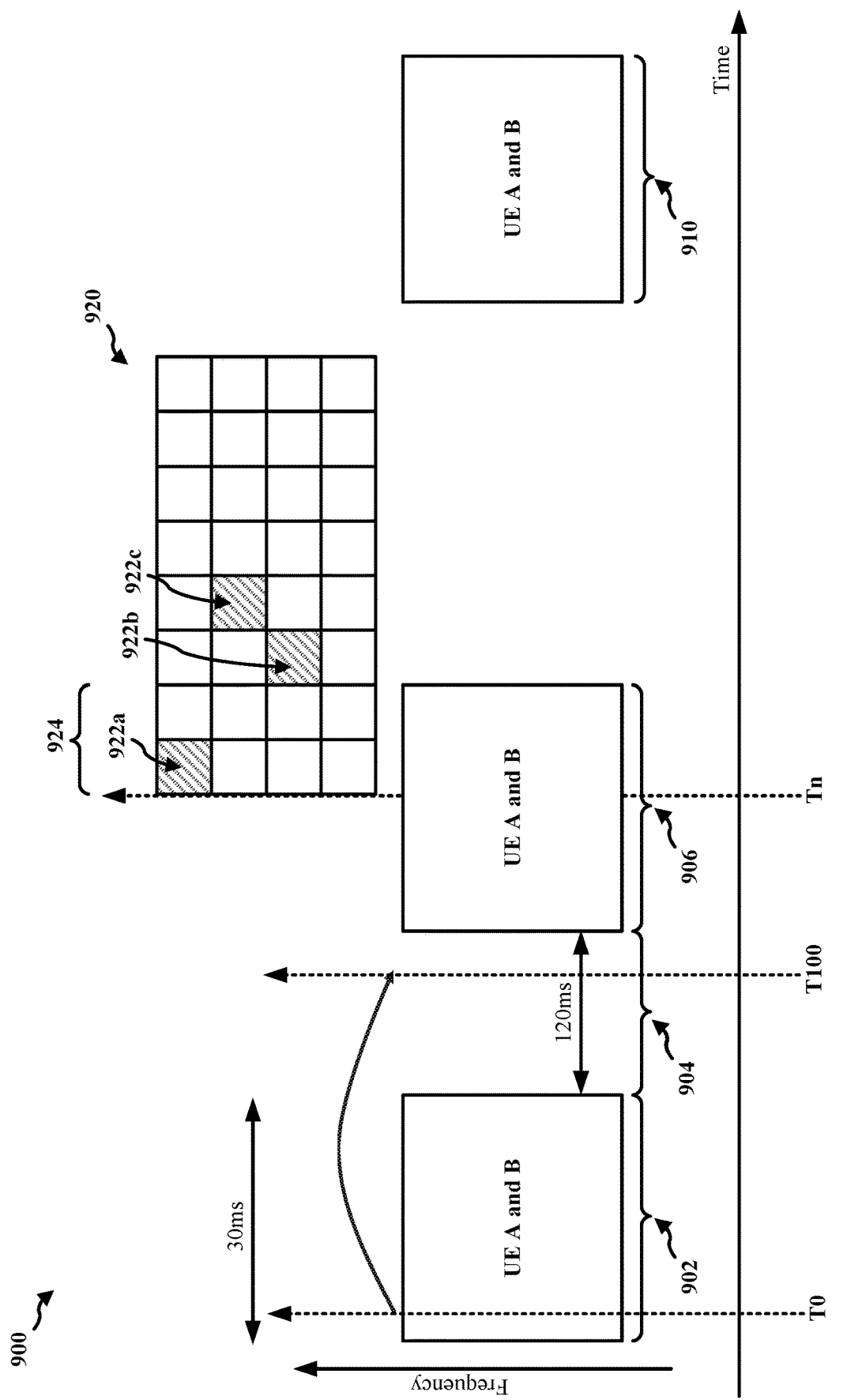
FIG. 9 is a diagram illustrating on-durations corresponding to periods during which a pair of UEs are operating in an awake state, in accordance with the teachings disclosed herein.

As shown in FIG. 8A, in some examples, a UE (or a pair of UEs) may operate in an awake state during some periods and may operate in a sleep state during other periods. For a UE configured with a power saving mode, the UE may reserve resources for a future transmission that may fall outside the on-duration of the UE. FIG. 9 illustrates a diagram 900 including a first on-duration 902, a second on-duration 906, and a third on-duration 910 corresponding to periods during which a pair of UEs (e.g., a UE A and a UE B) are operating in an awake state. With respect to an aperiodic resource reservation, which may be limited to 32 slots, the reserved resources may occur outside the current on-duration or next on-duration for a UE. For example, in FIG. 9, the UE A may transmit a packet at a time T1 during the second on-duration 906. For example, the UE A may transmit the packet using a first slot 922a of a reservation window 920 starting at the time Tn. The UE A may also reserve two resources in the future (e.g., at a second slot 922b and at a third slot 922c). However, as shown in FIG. 9, the transmission of the packet at the first slot 922a may occur at a time such that the majority of the 32 slots of the reservation window 920 occur outside the second on-duration 906 and before the third on-duration 910. In some aspects, such a resource reservation for the UE A may be inefficient as the available slots of the reservation window 920 that the UE A may use for resource reservation during the second on-duration 906 (e.g., a subset of slots 924 of the reservation window 920) may be much smaller than the 32 slots of the reservation window 920.

With respect to periodic resource reservation, if the period indicated by the UE for resource reservation is unaligned (e.g., does not align) with the on-duration of the UE, then the UE may lose the periodic reservation and may re-do the sensing and reservation procedures. For example, the UE A may transmit a packet at a time T0 of the first on-duration 902. The UE A may also indicate a period of 100 ms. However, it may be possible that the period of the first on-duration 902 is 30 ms and a period of an off-duration 904 between the first on-duration 902 and the second on-duration 906 may be 120 ms. In some such examples, the start of the next period (e.g., at the time T100) may occur during the off-duration 904 and, thus, the UE A may miss the reservation opportunity.

Figure 10:
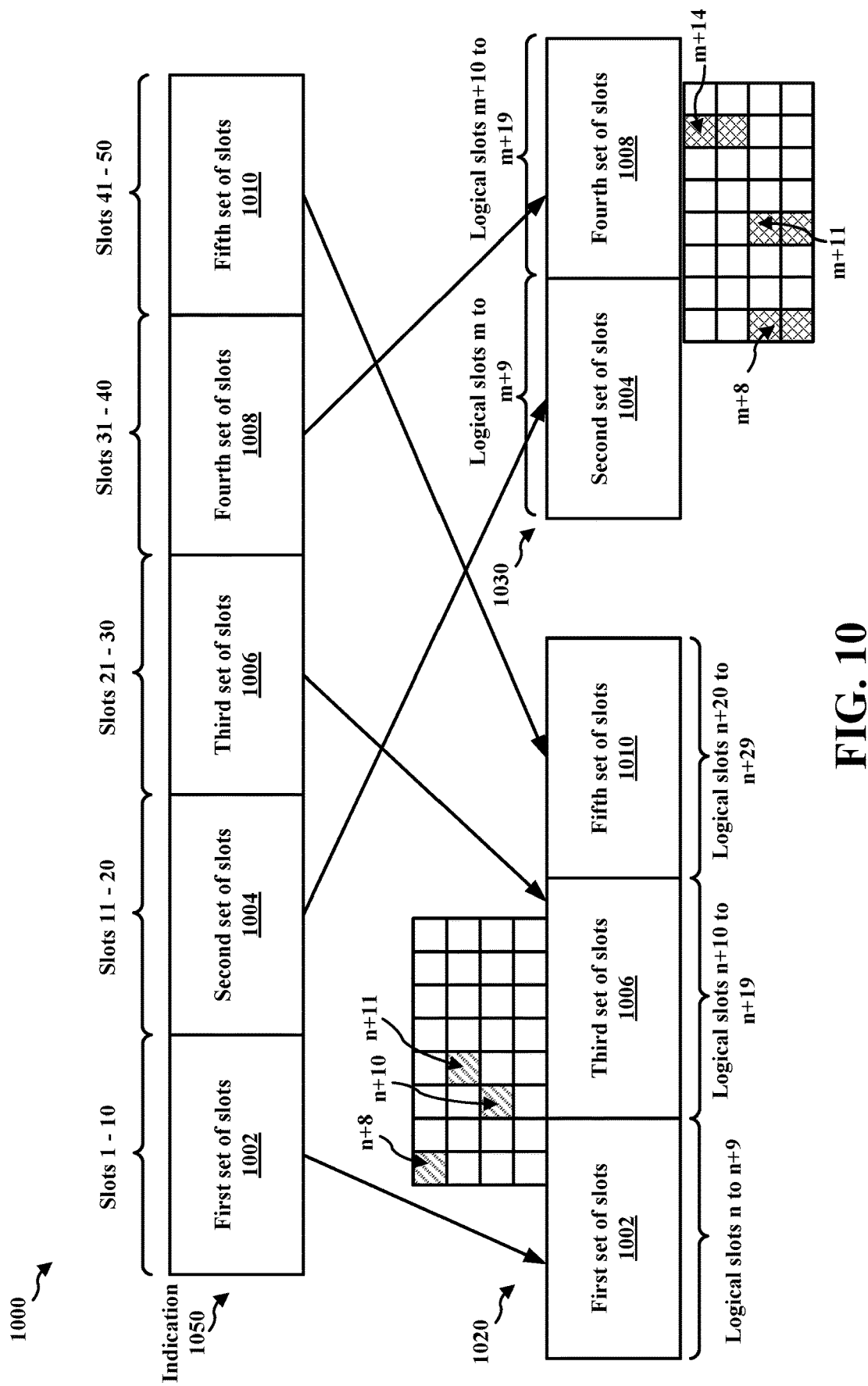
FIG. 10 is a diagram illustrating a mapping of physical slots of a resource pool to logical slots of a logical slot resource pool, in accordance with the teachings disclosed herein.

FIG. 10 depicts a diagram including a resource pool 1000 comprising a plurality of physical slots, in accordance with the teachings disclosed herein. In the illustrated example, the resource pool 1000 of FIG. 10 is divided into five sets of slots each comprising 10 physical slots. For example, a first set of slots 1002 comprises physical slots 1 to 10, a second set of slots 1004 comprises physical slots 11 to 20, a third set of slots 1006 comprises physical slots 21 to 30, a fourth set of slots 1008 comprises physical slots 31 to 40, and a fifth set of slots 1010 comprises physical slots 41 to 50. When a UE is configured with a power saving mode, the UE may be configured with a subset of slots during which the UE is to operate in the awake mode (e.g., an on-duration). For example, a UE A and a UE B may be configured to operate in the awake state during the first set of slots 1002, the third set of slots 1006, and the fifth set of slots 1010. In a similar manner, a UE C and a UE D may be configured to operate in the awake state during the second set of slots 1004 and the fourth set of slots 1008. In some aspects, when a UE is not configured to be in an awake state, the UE may operate in the sleep state. As shown in the example of FIG. 9 above, it may be possible for a resource reservation to occur during an off-duration of a UE.

Aspects disclosed herein enable resource reservation based on concatenated logical slot indices. For example, aspects disclosed herein facilitate a UE concatenating on-duration windows for the UE and mapping the concatenated logical slots to physical slots. That is, the UE may map subsets of physical slots during which the UE is operating in an awake state (e.g., physical slots corresponding to an on-duration) to contiguous logical slots. In some aspects, the on-duration may refer to a DRX ON duration (e.g., a configured duration based on a DRX configuration where a UE monitors for PDCCH, PSCCH, or the like) or a DRX active duration (e.g., a duration where a UE is awake, which may include the duration where a UE monitors for a channel such as a PDCCH or a PSCCH, a duration where a UE is receiving a PDCCH or a PSCCH, and a duration where the UE is not asleep due to one or more transmissions). In some aspects, the on-duration may refer to a partial sensing duration during which the UE performs sensing.

For example, the UE A and the UE B may concatenate the on-duration windows for the UE A and the UE B, respectively, and generate a mapping of the concatenated on-duration windows to contiguous logical slots. For example, the UE A may concatenate the first set of slots 1002, the third set of slots 1006, and the fifth set of slots 1010 to form a first logical slot resource pool 1020 and map the physical slots of the respective sets of slots of the resource pool 1000 to logical slots of the first logical slot resource pool 1020. The first logical slot resource pool 1020 may exclude the physical slots corresponding to the off-duration of the UE A and the UE B. As an example, the physical slots 1 to 10 of the first set of slots 1002 may map to logical slots n to n+9 of the first logical slot resource pool 1020, the physical slots 21 to 30 of the third set of slots 1006 may map to logical slots n+10 to n+19 of the first logical slot resource pool 1020, and the physical slots 41 to 50 of the fifth set of slots 1010 may map to logical slots n+20 to n+29 of the first logical slot resource pool 1020. The UE A may transmit a packet to the UE B at logical slot n+8. The UE A may also indicate slots, using SCI, to reserve a first resource at a logical slot n+10 and a second resource at a logical slot n+11 of the first logical slot resource pool 1020. The UE A may map the logical slot n+10 of the first logical slot resource pool 1020 to the physical slot 21 of the third set of slots 1006 of the resource pool 1000. The UE A may also map the logical slot n+11 of the first logical slot resource pool 1020 to the physical slot 22 of the third set of slots 1006 of the resource pool 1000.

The UE B may receive a packet from the UE A at logical slot n+8. The packet may also indicate (e.g., via the SCI) that the UE A is reserving a first resource at the logical slot n+10 and a second resource at the logical slot n+11. The UE B may use the mapping between the physical slots of the resource pool 1000 to the logical slots of the first logical slot resource pool 1020 to determine the physical slots corresponding to the resource reservation. For example, the UE B may determine that the logical slot n+8 corresponds to the physical slot 8 of the resource pool 1000, that the logical slot n+10 of the first logical slot resource pool 1020 corresponds to the physical slot 21 of the resource pool 1000, and that the logical slot n+11 of the first logical slot resource pool 1020 corresponds to the physical slot 22 of the resource pool 1000.

In a similar manner to the UE A and the UE B, the UE C and the UE D may concatenate the on-duration windows for the UE C and the UE D and generate a mapping of the concatenated on-duration windows to logical slots. For example, the UE C may concatenate the second set of slots 1004 and the fourth set of slots 1008 to form a second logical slot resource pool 1030 and map the physical slots of the respective sets of slots of the resource pool 1000 to logical slots of the second logical slot resource pool 1030. The second logical slot resource pool 1030 may exclude the physical slots corresponding to the off-durations of the UE C and the UE D. As an example, the physical slots 11 to 20 of the second set of slots 1004 may map to logical slots m to m+9 of the second logical slot resource pool 1030 and the physical slots 31 to 40 of the fourth set of slots 1008 may map to logical slots m+10 to m+19 of the second logical slot resource pool 1030. The UE C may transmit a packet to the UE D at logical slot m+8. The UE C may also indicate slots, using SCI, to reserve a first resource at a logical slot m+11 and a second resource at a logical slot m+14 of the second logical slot resource pool 1030. The UE C may map the logical slot m+11 of the second logical slot resource pool 1030 to the physical slot 32 of the fourth set of slots 1008 of the resource pool 1000 and may map the logical slot m+14 of the second logical slot resource pool 1030 to the physical slot 35 of the fourth set of slots 1008 of the resource pool 1000.

The UE D may receive the packet from the UE C at the logical slot m+8. The packet may also indicate (e.g., via the SCI) that the UE C is reserving a first resource at the logical slot m+11 and a second resource at the logical slot m+14. The UE D may use the mapping between the physical slots of the resource pool 1000 to the logical slots of the second logical slot resource pool 1030 to determine the physical slots corresponding to the resource reservation. For example, the UE D may determine that the logical slot m+8 of the second logical slot resource pool 1030 corresponds to the physical slot 19 of the resource pool 1000, that the logical slot m+11 of the second logical slot resource pool 1030 corresponds to the physical slot 32 of the resource pool 1000, and that the logical slot m+14 of the second logical slot resource pool 1030 corresponds to the physical slot 35 of the resource pool 1000.

The techniques disclosed herein may apply for aperiodic resource reservation and/or for periodic resource reservation. As described above, in some examples, a UE may indicate a periodic resource reservation by indicating a period. In some such examples, the period may be converted from a unit of the period (e.g., a number of milliseconds) to a number of logical slots. For example, a period of 100 ms may be converted into 15 logical slots.

As shown in FIG. 10, the resource reservations may be indicated using the first logical slot resource pool 1020 and/or the second logical slot resource pool 1030. For example, the resource reservation indicated in SCI by the transmitting UE may be interpreted by the receiving UE as with respect to the respective logical slot resource pool. Accordingly, during, for example, the first set of slots 1002, a UE may be able to reserve resources that occur during the third set of slots 1006.

In some examples, a resource pool (e.g., the resource pool 1000 of FIG. 10) may be shared by UEs that are not configured with a power saving mode. For example, a UE may be configured to continuously operate in an awake state. In some such examples, an always-on UE may be incapable of interpreting the logical slot indices of the first logical slot resource pool 1020 and/or the second logical slot resource pool 1030 of FIG. 10 because the always-on UE does not have an on-duration and off-duration pattern.

Aspects disclosed herein configure a UE to use logical slot indices for resource reservations when the resource pool is shared by UEs configured with power saving mode, such as the DRX mechanism and/or the partial sensing mechanism. That is, if a resource pool is shared by UEs that are configured with a power saving mode or that are configured to perform full sensing, then the UE may avoid using logical slot indices for resource reservations. Instead, the UE may use physical slots of the resource pool, regardless of whether an indicated slot is part of an on-duration or an off-duration (as shown in connection with FIG. 9).

In some examples, the UE may be configured to determine the sidelink resource reservation based on a logical slot or a physical slot based on a configuration parameter. For example, the UE may receive the configuration parameter when applying the power saving mode. The UE may receive the configuration parameter via RRC signaling, via a MAC-control element (MAC-CE), via downlink control information (DCI), and/or via SCI.

In some examples, the resource pool may be configured with an indication 1050 regarding whether UEs are to use logical slot indices or to use physical slot indices of the resource pool for resource reservations. For example, based on the indication 1050, the UEs communicating using the resource pool 1000 may use physical slot indices of the resource pool 1000 or may use logical slot indices mapping to physical slots of the resource pool 1000.

Figure 11:
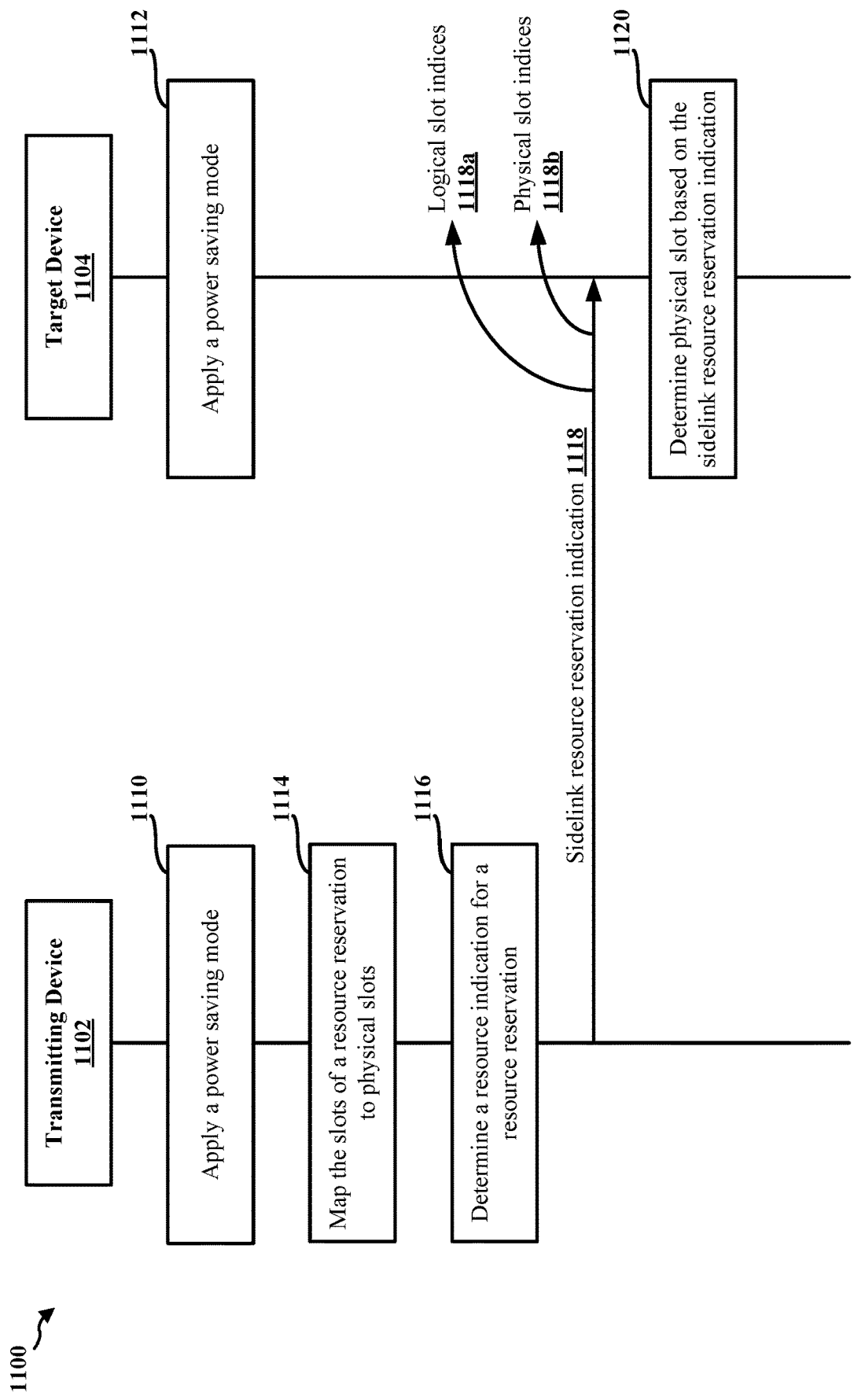
FIG. 11 is an example communication flow between a transmitting device and a target device, in accordance with the teachings disclosed herein.

FIG. 11 illustrates an example communication flow 1100 between a transmitting device 1102 and a target device 1104, as presented herein. In the illustrated example, the communication flow 1100 facilitates the devices performing resource reservations while configured with and applying a power saving mode. Aspects of the transmitting device 1102 may be implemented by the UE 104 of FIG. 1, the first wireless communication device 310 of FIG. 3, the first UE 402 of FIG. 4, the UE A of FIGS. 8, 9, and/or 10, and/or the UE C of FIGS. 8 and/or 10. Aspects of the target device 1104 may be implemented by the UE 104 of FIG. 1, the second wireless communication device 350 of FIG. 3, the second UE 406 of FIG. 4, the UE B of FIGS. 8, 9, and/or 10, and/or the UE D of FIGS. 8 and/or 10. Although not shown in the illustrated example of FIG. 11, it may be appreciated that in additional or alternative examples, the transmitting device 1102 and/or the target device 1104 may be in communication with one or more base stations or other UEs.

In the illustrated example of FIG. 11, at 1110, the transmitting device 1102 applies a power saving mode. At 1112, the target device 1104 may also apply a power saving mode. The power saving mode (e.g., at 1110 and/or 1112) may comprise a partial sensing mechanism, as described in connection with FIG. 6. In some examples, the partial saving mode may comprise a DRX mechanism. When the transmitting device 1102 and the target device 1104 apply the power saving mode, they may each be configured with a subset of slots during which the respective devices are to operate in the awake state (e.g., an on-duration). For example, the transmitting device 1102 and the target device 1104 may be configured to operate in the awake state during the first set of slots 1002, the third set of slots 1006, and the fifth set of slots 1010 of FIG. 10. In some examples, the subset of slots during which the devices are to operate in the awake state correspond to periodic on-durations and may be based on a common on and off pattern for a wireless communication system. For example, the periodic on-durations for the transmitting device 1102 and the target device 1104 may be based on a global power saving pattern.

At 1116, the transmitting device 1102 may determine a resource indication for a resource reservation. The resource indication for the resource reservation may correspond to a physical slot of a resource pool (e.g., the physical slots 1 to 50 of the resource pool 1000) or may correspond to a logical slot of a logical slot resource pool (e.g., the logical slots n to n+29 of the first logical slot resource pool 1020 or the logical slots m to m+19 of the second logical slot resource pool 1030).

In some examples, the transmitting device 1102 may determine the resource indication (e.g., at 1116) based on a configuration of the transmitting device 1102. For example, the transmitting device 1102 may be configured to determine the resource indication based on logical slots or physical slots. In some examples, the configuration to determine the resource indication based on logical slots or physical slots may be provided when the transmitting device 1102 is applying the power saving mode (e.g., at 1110). In some examples, the transmitting device 1102 may determine the resource indication based on logical slots or physical slots based on an indication associated with the resource pool. For example, when the resource pool is being shared by devices configured for applying a partial sensing mechanism or a DRX mechanism, the transmitting device 1102 may determine the resource indication based on logical slots. When the resource pool is being shared by one or more devices that are not configured for applying a power saving mode (e.g., an always-on device or a device configured to apply a full sensing mechanism), the transmitting device 1102 may determine the resource indication based on physical slots. In some examples, the resource pool may include an indication on whether the resource pool is being shared by devices that are configured for applying a partial sensing mechanism or a DRX mechanism, or is being shared by at least one device that is not configured for applying a partial sensing mechanism or a DRX mechanism or is configured for applying a full sensing mechanism (e.g., a resource pool that is unexclusive to the power saving mode), such as the example indication 1050 of FIG. 10.

When the transmitting device 1102 determines the resource indication based on logical slots, at 1114, the transmitting device 1102 may map the slots of the resource reservation to physical of the resource pool. In some examples, the transmitting device 1102 may determine a logical slot resource pool based on the physical slots corresponding to the on-durations of the transmitting device 1102. For example, the transmitting device 1102 may generate the first logical slot resource pool 1020 of FIG. 10 based on the first sets of slots 1002, the second set of slots 1004, and the third set of slots 1006 of the resource pool 1000 corresponding on the on-duration of the UE A. With respect to the UE C, the transmitting device 1102 may generate the second logical slot resource pool 1030 of FIG. 10 based on the second set of slots 1004 and the fourth set of slots 1008. The transmitting device 1102 may map the physical slots of the resource pool 1000 to the logical slots of the logical slot resource pool (e.g., to the first logical slot resource pool 1020 or the second logical slot resource pool 1030).

In some examples in which the transmitting device 1102 is performing a periodic resource reservation and the period is indicated in the time domain (e.g., in milliseconds), the transmitting device 1102 may convert the indicated period into logical slots. For example, the transmitting device 1102 may convert a period of 100 ms into 15 logical slots.

As shown in FIG. 11, the transmitting device 1102 transmits a sidelink resource reservation indication 1118 that is received by the target device 1104. The transmitting device 1102 may transmit the sidelink resource reservation indication 1118 using SCI. The sidelink resource reservation indication 1118 may include indications for one or two future slots for reservation. In some examples, the sidelink resource reservation indication 1118 may include logical slot indices 1118*a* for reserving one or two future resources. For example, with respect to the UE A of FIG. 10, the sidelink resource reservation indication 1118 may indicate the logical slot n+10 corresponding to a first future resource and the logical slot n+11 corresponding to a second future resource. In some examples, the sidelink resource reservation indication 1118 may include physical slot indices 1118*b* for reserving one or two future resources. For example, with respect to the UE A of FIG. 10, the sidelink resource reservation indication 1118 may indicate the physical slot 21 corresponding to the first future resource and the physical slot 22 corresponding to the second future resource.

At 1120, the target device 1104 determines a physical slot reserved by the transmitting device 1102 based on the sidelink resource reservation indication 1118. For example, the target device 1104 may map a logical slot index of the sidelink resource reservation indication 1118 to a physical slot. For example, the sidelink resource reservation indication 1118 may include the logical slot indices 1118*a*. Referring to the example of FIG. 10, the logical slot indices 1118*a* may include the logical slot n+11. The target device 1104 may map the logical slot n+11 of the first logical slot resource pool 1020 to the physical slot 22 of the third set of slots 1006 of the resource pool 1000.

In some examples, when the sidelink resource reservation indication 1118 includes the physical slot indices 1118*b*, then the target device 1104 may determine the future resource(s) reserved by the transmitting device 1102 based on the physical slot indices 1118*b*.

Figure 12:
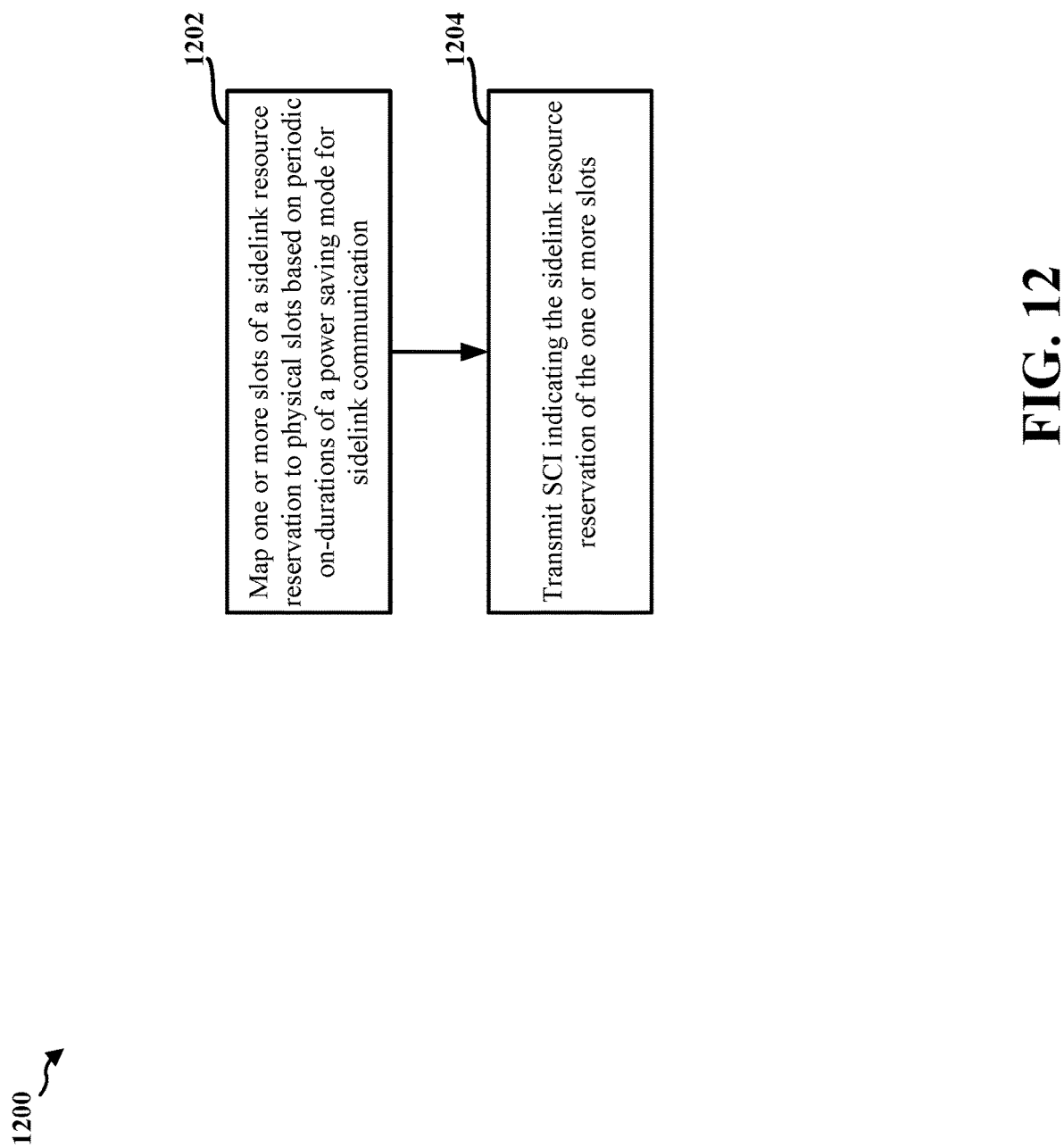
FIG. 12 is a flowchart of a method of wireless communication at a wireless device, in accordance with the teachings disclosed herein.

FIG. 12 is a flowchart 1200 of a method of wireless communication. The method may be performed by a wireless device, such as a UE (e.g., the UE 104, the second wireless communication device 350, and/or an apparatus 1502 of FIG. 15). The method may facilitate improving sidelink communications by enabling a wireless device to perform resource reservation when applying a power saving mode.

At 1202, the wireless device maps one or more slots of a sidelink resource reservation to physical slots based on periodic on-durations of a power saving mode for sidelink communication, as described in connection with 1114 of FIG. 11. The mapping of one or more slots to physical slots, at 1202, may be performed by a mapping component 1540 of the apparatus 1502 of FIG. 15.

At 1204, the wireless device transmits SCI indicating the sidelink resource reservation of the one or more slots, as described in connection with the sidelink resource reservation indication 1118 of FIG. 11. The transmitting of the SCI indicating the sidelink resource reservation, at 1204, may be performed by an SCI component 1542 of the apparatus 1502 of FIG. 15.

In some examples, the SCI may indicate the sidelink resource reservation based on a set of contiguous logical slots comprising a concatenation of slots (e.g., sets of slots) from the periodic on-durations of the power saving mode, as described in connection with the first logical slot resource pool 1020 and/or the second logical slot resource pool 1030 of FIG. 10. For example, the set of contiguous logical slots may be based on a mapping of physical slots excluding off-durations of the power saving mode. In some examples, the SCI may indicate the sidelink resource reservation in a unit based on a number of logical slots. For example, the SCI may indicate a period of 100 ms as 15 logical slots.

In some examples, the sidelink resource reservation may indicate the one or more slots based on the periodic on-durations of the power saving mode when the sidelink resource reservation is based on a first resource pool for the power saving mode, such as the first logical slot resource pool 1020 and/or the second logical slot resource pool 1030 of FIG. 10.

Figure 13:
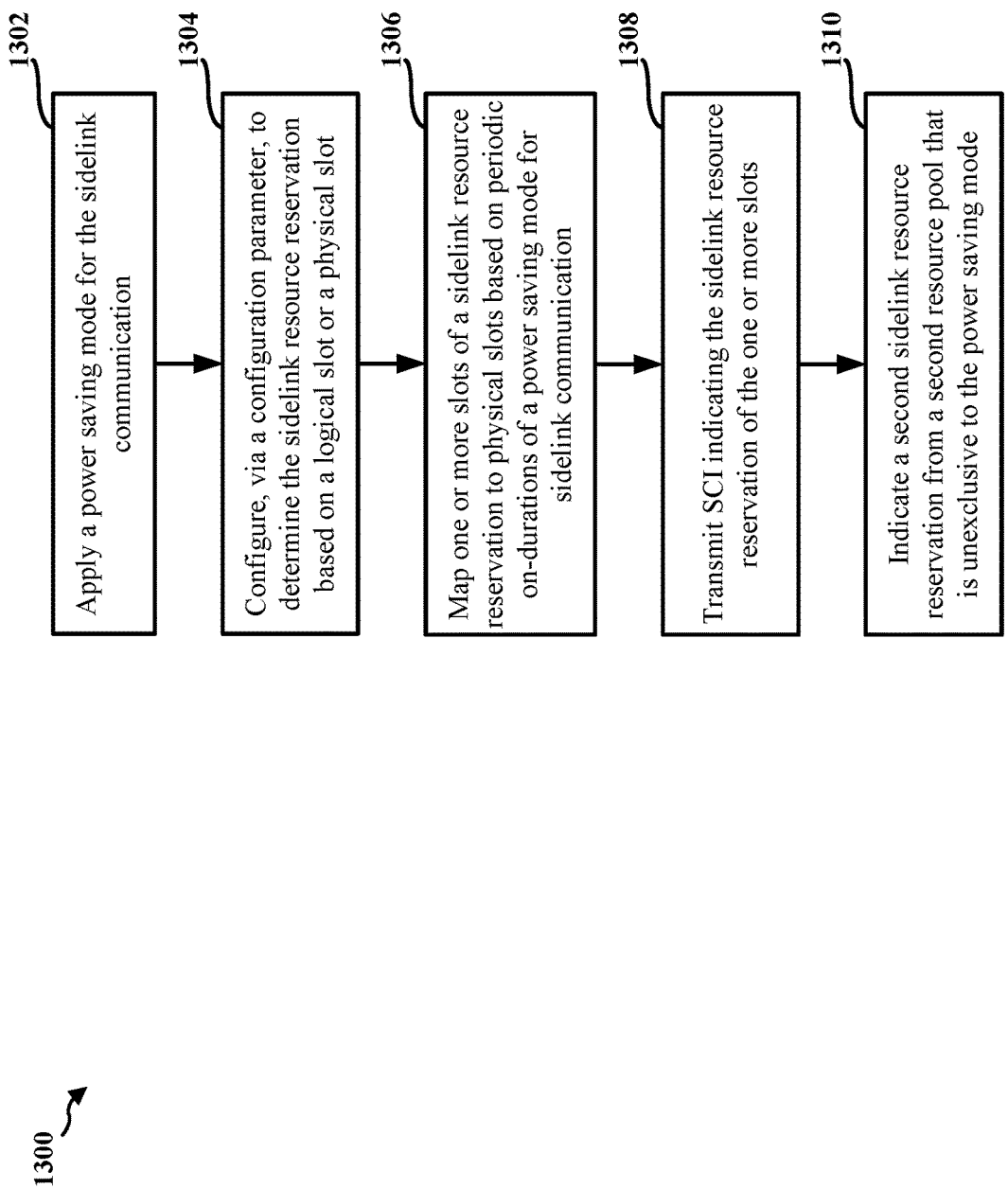
FIG. 13 is a flowchart of a method of wireless communication at a wireless device, in accordance with the teachings disclosed herein.

FIG. 13 is a flowchart 1300 of a method of wireless communication. The method may be performed by a wireless device, such as a UE (e.g., the UE 104, the second wireless communication device 350, and/or an apparatus 1502 of FIG. 15). The method may facilitate improving sidelink communications by enabling a wireless device to perform resource reservation when applying a power saving mode.

At 1302, the wireless device may apply a power saving mode for the sidelink communication, as described in connection with 1110 of FIG. 11. The applying of the power saving mode, at 1302, may be performed by a power saving mode component 1544 of the apparatus 1502 of FIG. 15.

In some examples, the power saving mode may include one or more periodic on-durations, such as the example first on-duration 802, the third on-duration 806, and the fifth on-duration 810 of FIG. 8A FIGS. 8B and 8C illustrate additional example aspects of on durations for low power modes. In some examples, the periodic on-durations for the wireless device are based on a common on and off pattern for a wireless communication system. In some examples, the power saving mode may be based on a DRX mode. In some examples, the power saving mode may be based on a partial sensing mode.

At 1306, the wireless device maps one or more slots of a sidelink resource reservation to physical slots based on periodic on-durations of a power saving mode for sidelink communication, as described in connection with 1114 of FIG. 11. The mapping of one or more slots to physical slots, at 1306, may be performed by a mapping component 1540 of the apparatus 1502 of FIG. 15.

At 1308, the wireless device transmits SCI indicating the sidelink resource reservation of the one or more slots, as described in connection with the sidelink resource reservation indication 1118 of FIG. 11. The transmitting of the SCI indicating the sidelink resource reservation, at 1308, may be performed by an SCI component 1542 of the apparatus 1502 of FIG. 15.

In some examples, the SCI may indicate the sidelink resource reservation based on a set of contiguous logical slots comprising a concatenation of slots (e.g., sets of slots) from the periodic on-durations of the power saving mode, as described in connection with the first logical slot resource pool 1020 and/or the second logical slot resource pool 1030 of FIG. 10. For example, the set of contiguous logical slots may be based on a mapping of physical slots excluding off-durations of the power saving mode. In some examples, the SCI may indicate the sidelink resource reservation in a unit based on a number of logical slots. For example, the SCI may indicate a period of 100 ms as 15 logical slots.

In some examples, the sidelink resource reservation may indicate the one or more slots based on the periodic on-durations of the power saving mode when the sidelink resource reservation is based on a first resource pool for the power saving mode, such as the first logical slot resource pool 1020 and/or the second logical slot resource pool 1030 of FIG. 10.

At 1310, the wireless device may indicate a second sidelink resource reservation from a second resource pool that is unexclusive to the power saving mode, as described in connection with the physical slot indices 1118b of the sidelink resource reservation indication 1118 of FIG. 11. The indicating of the second sidelink resource reservation, at 1310, may be performed by an unexclusive indicator component 1546 of the apparatus 1502 of FIG. 15.

At 1304, the wireless device may configure, via a configuration parameter, to determine the sidelink resource reservation based on a logical slot or a physical slot, as described in connection with 1116 of FIG. 11. The configuring to determine the sidelink resource reservation, at 1304, may be performed by a configuration component 1548 of the apparatus 1502 of FIG. 15.

In some examples, the wireless device may be provided the configuration parameter when applying the power saving mode (e.g., at 1302). In some examples, the configuration parameter may be indicated by a resource pool used by the wireless device for the sidelink communication, such as the indication 1050 of FIG. 10.

Figure 14:
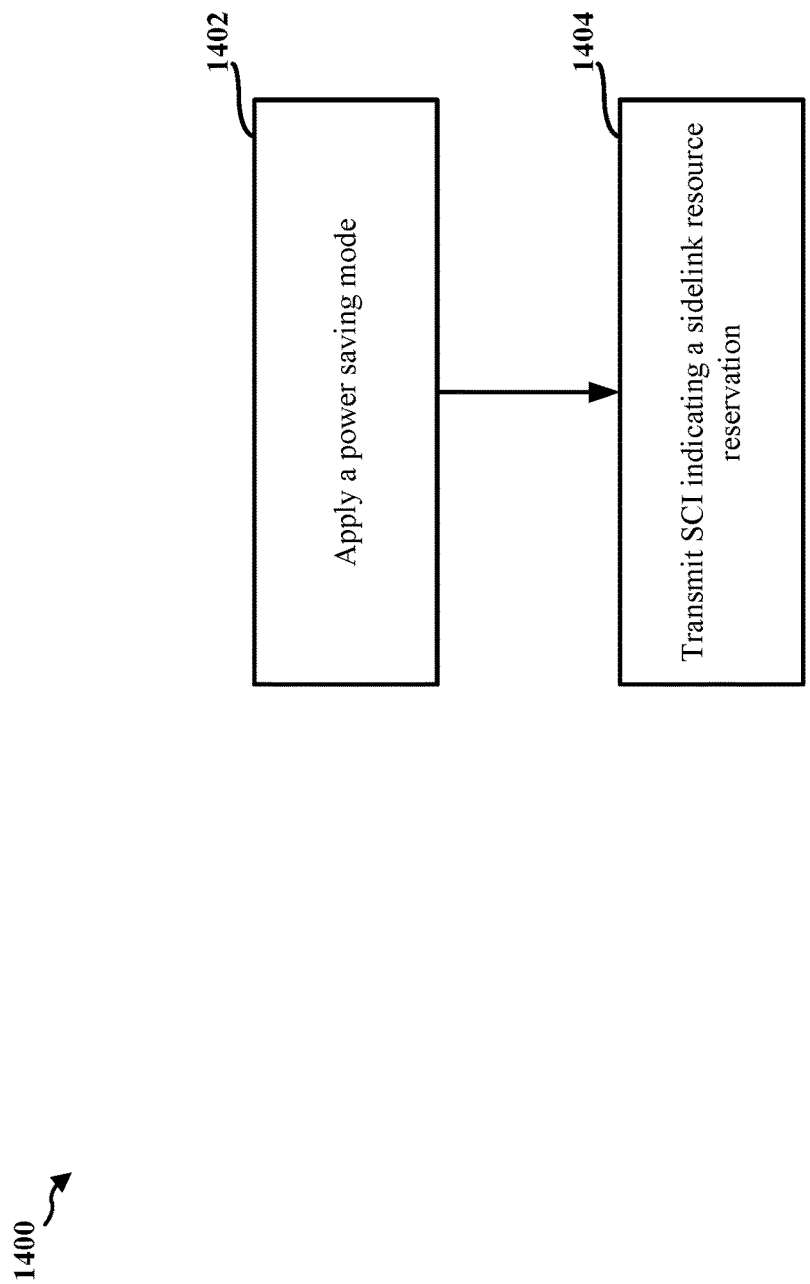
FIG. 14 is a flowchart of a method of wireless communication at a wireless device, in accordance with the teachings disclosed herein.

FIG. 14 is a flowchart 1400 of a method of wireless communication. The method may be performed by a wireless device, such as a UE (e.g., the UE 104, the second wireless communication device 350, and/or an apparatus 1502 of FIG. 15). The method may facilitate improving sidelink communications by enabling a wireless device to perform resource reservation when applying a power saving mode.

At 1402, the wireless device applies a power saving mode for sidelink communication, as described in connection with 1110 of FIG. 11. For example, the applying of the power saving mode may be performed by the power saving mode component 1544 of the apparatus 1502 of FIG. 15. In some examples, the power saving mode may be based on a partial sensing mode. In some examples, the power saving mode may be based on DRX.

The power saving mode may include periodic on-durations. For example, the power saving mode may include periodic on-durations corresponding to the first set of slots 1002, the third set of slots 1006, and the fifth set of slots 1010 of the resource pool 1000 of FIG. 10.

At 1404, the wireless device transmits an SCI indicating a sidelink resource reservation, as described in connection with the sidelink resource reservation indication 1118 of FIG. 11. For example, the transmitting of the SCI may be performed by the SCI component 1542 of the apparatus 1502 of FIG. 15. The sidelink resource reservation may indicate one or more slots based on the periodic on-durations of the power saving mode.

In some examples, the SCI may indicate the sidelink resource reservation based on a set of contiguous logical slots comprising a concatenation of sets of slots from the periodic on-durations of the power saving mode, as described in connection with the first logical slot resource pool 1020 and/or the second logical slot resource pool 1030 of FIG. 10. In some examples, the set of contiguous logical slots may be based on a mapping to physical slots excluding periodic off-durations of the power saving mode. In some examples, the SCI may indicate the sidelink resource reservation in a unit based on a number of logical slots.

In some examples, the sidelink resource reservation may indicate the one or more slots based on the periodic on-durations of the power saving mode if the sidelink resource reservation is based on a first resource pool for the power saving mode. For example, the sidelink resource reservation may indicate the one or more slots based on logical slot indices when the first resource pool is shared by devices configured for applying a partial sensing mode or a DRX mode.

In some examples, the wireless device may indicate other sidelink resource reservations from a second resource pool that is not exclusive to the power saving mode by indicating a reservation based on physical slots that include the periodic on-duration and a periodic off-duration of the power saving mode.

In some examples, the periodic on-durations for the wireless device are based on a common on and off pattern for a wireless communication system. For example, the periodic on-durations for the wireless device may be based on a global power saving pattern.

In some examples, the wireless device may be configured, via a configuration parameter, to determine the sidelink resource reservation based on a logical slot or a physical slot. In some examples, the configuration parameter may be provided when the wireless device applies the power saving mode. In some examples, the configuration parameter may be indicated by a resource pool used by the wireless device for sidelink communication, such as the example indication 1050 of the resource pool 1000 of FIG. 10.

Figure 15:
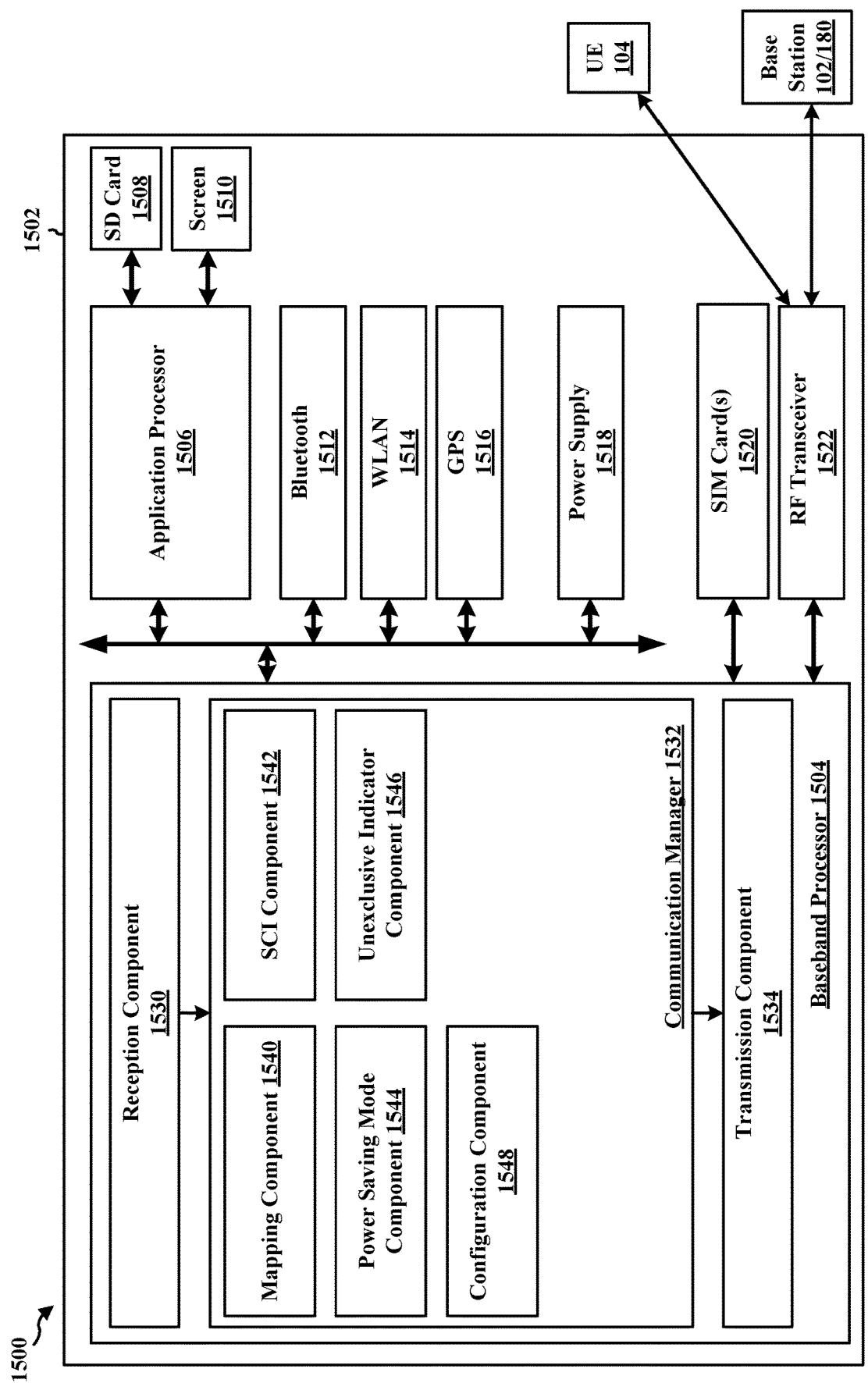
FIG. 15 is a diagram illustrating an example of a hardware implementation for an example apparatus, in accordance with the teachings disclosed herein.

FIG. 15 is a diagram 1500 illustrating an example of a hardware implementation for an apparatus 1502. The apparatus 1502 may be a UE, or another device configured to transmit and/or receive sidelink communication. The apparatus 1502 includes a baseband processor 1504 (also referred to as a modem) coupled to a RF transceiver 1522. In some aspects, the baseband processor 1504 may be a cellular baseband processor and/or the RF transceiver 1522 may be a cellular RF transceiver. The apparatus 1502 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and/or a power supply 1518. The baseband processor 1504 communicates through the RF transceiver 1522 with the UE 104 and/or the base station 102/180. The baseband processor 1504 may include a computer-readable medium/memory. The computer-readable medium/memory may be non-transitory. The baseband processor 1504 is responsible for general processing, including the execution of software stored on the computer-readable medium/memory. The software, when executed by the baseband processor 1504, causes the baseband processor 1504 to perform the various functions described in the present application. The computer-readable medium/memory may also be used for storing data that is manipulated by the baseband processor 1504 when executing software. The baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband processor 1504. The baseband processor 1504 may be a component of the second wireless communication device 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see the second wireless communication device 350 of FIG. 3) and include the additional modules of the apparatus 1502.

The communication manager 1532 includes a mapping component 1540 that is configured to map one or more slots of a sidelink resource reservation to physical slots based on periodic on-durations of a power saving mode for sidelink communication, for example, as described in connection with 1202 of FIG. 12 and/or 1306 of FIG. 13.

The communication manager 1532 also includes an SCI component 1542 that is configured to transmit SCI indicating the sidelink resource reservation that indicates the one or more slots, for example, as described in connection with 1204 of FIG. 12 and/or 1308 of FIG. 13. The example SCI component 1542 may also be configured to transmit an SCI indicating a sidelink resource reservation, for example, as described in connection with 1404 of FIG. 14.

The communication manager 1532 also includes a power saving mode component 1544 that is configured to apply a power saving mode for the sidelink communication, for example, as described in connection with 1302 of FIG. 13. The example power saving mode component 1544 may also be configured to apply a power saving mode for sidelink communication, for example, as described in connection with 1402 of FIG. 14.

The communication manager 1532 also includes an unexclusive indicator component 1546 that is configured to indicate a second sidelink resource reservation from a second resource pool that is unexclusive to the power saving mode, for example, as described in connection with 1310 of FIG. 13.

The communication manager 1532 also includes a configuration component 1548 that is configured to configure, via a configuration parameter, to determine the sidelink resource reservation based on a logical slot or a physical slot, for example, as described in connection with 1304 of FIG. 13.

The apparatus may include additional components that perform each of the blocks of the algorithm in the flowcharts of FIGS. 12, 13, and/or 14. As such, each block in the flowcharts of FIGS. 12, 13, and/or 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband processor 1504, includes means for mapping one or more slots of a sidelink resource reservation to physical slots based on periodic on-durations of a power saving mode for sidelink communication. The example apparatus 1502 also includes means for transmitting SCI indicating the sidelink resource reservation that indicates the one or more slots.

In another configuration, the example apparatus 1502 also includes means for applying the power saving mode for the sidelink communication, the power saving mode including one or more periodic on-durations.

In another configuration, the example apparatus 1502 also includes means for indicating a second sidelink resource reservation from a second resource pool that is unexclusive to the power saving mode by indicating the second sidelink resource reservation based on physical slots that include the periodic on-duration and a periodic off-duration of the power saving mode.

In another configuration, the example apparatus 1502 also includes means for being configured, via a configuration parameter, to determine the sidelink resource reservation based on a logical slot or a physical slot.

In one configuration, the apparatus 1502, and in particular the baseband processor 1504, includes means for applying a power saving mode for sidelink communication, the power saving mode having periodic on-durations. The example apparatus 1502 also includes means for transmitting SCI indicating a sidelink resource reservation that indicates one or more slots based on the periodic on-durations of the power saving mode.

The means may be one or more of the components of the apparatus 1502 configured to perform the functions recited by the means. As described supra, the apparatus 1502 may include the TX processor 368, the RX processor 356, and the controller/processor 359. As such, in one configuration, the means may be the TX processor 368, the RX processor 356, and the controller/processor 359 configured to perform the functions recited by the means.

Figure 16:
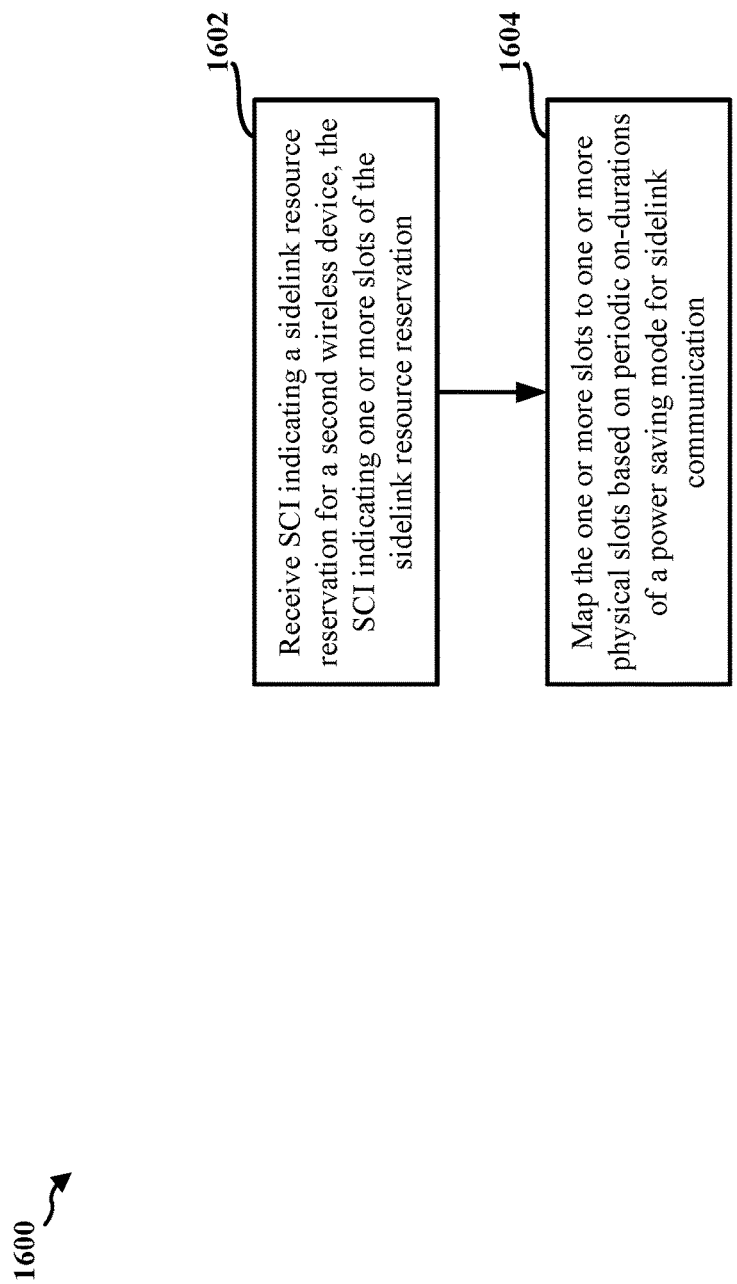
FIG. 16 is a flowchart of a method of wireless communication at a first wireless device, in accordance with the teachings disclosed herein.

FIG. 16 is a flowchart 1600 of a method of wireless communication. The method may be performed by a first wireless device, such as a UE (e.g., the UE 104, the first wireless communication device 310, and/or an apparatus 1902 of FIG. 19). The method may facilitate improving sidelink communications by enabling a wireless device to perform resource reservation when applying a power saving mode.

At 1602, the first wireless device receives SCI indicating a sidelink resource reservation for a second wireless device, the SCI indicating one or more slots of the sidelink resource reservation, as described in connection with sidelink resource reservation indication 1118 of FIG. 11. The receiving of the SCI indicating the sidelink resource reservation for a second wireless device, at 1602, may be performed by an SCI component 1940 of the apparatus 1902 of FIG. 19.

At 1604, the first wireless device maps the one or more slots to one or more physical slots based on periodic on-durations of a power saving mode for sidelink communication, as described in connection with 1120 of FIG. 11. The mapping of the one or more slots to physical slots, at 1604, may be performed by a mapping component 1942 of the apparatus 1902 of FIG. 19.

Figure 17:
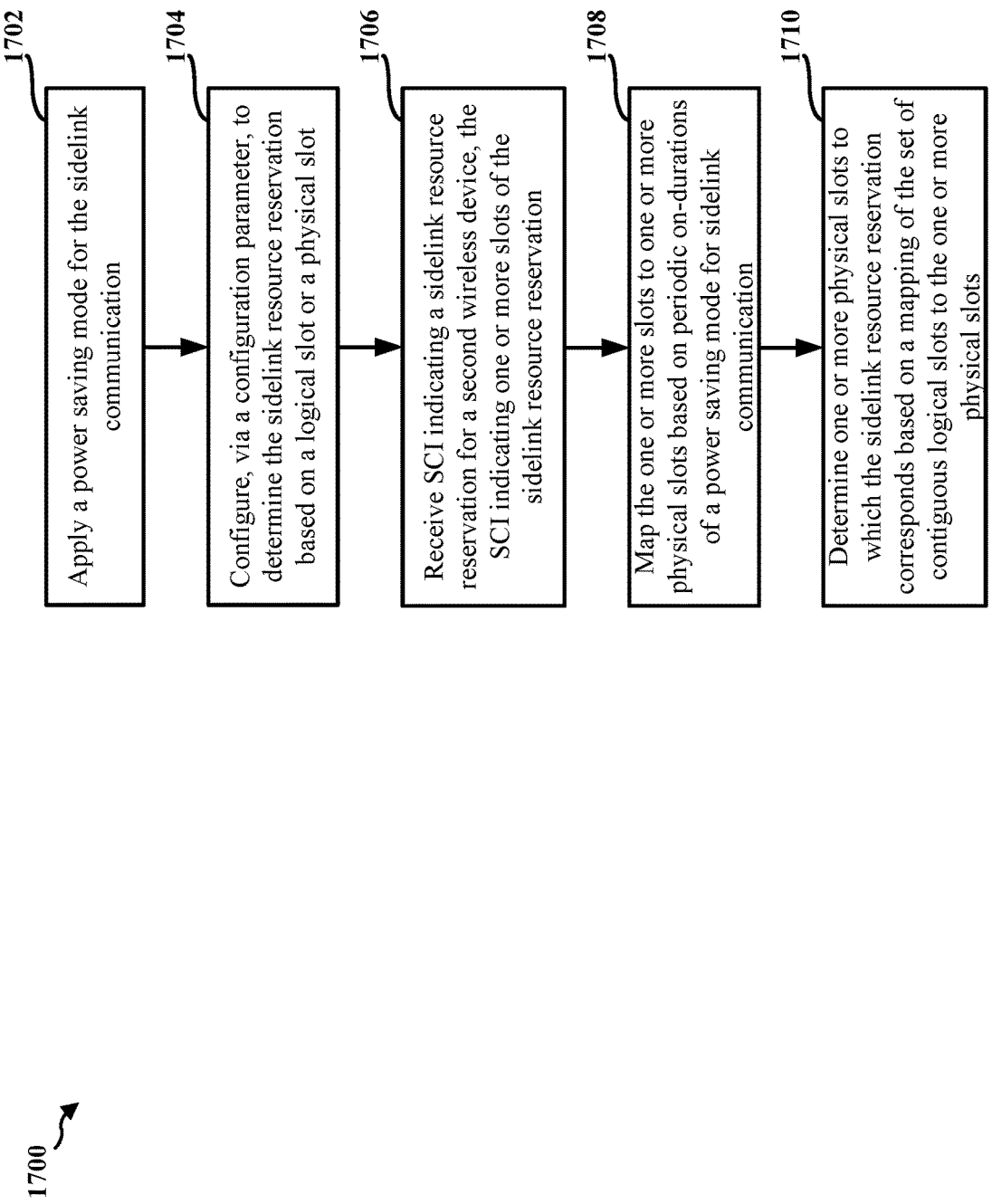
FIG. 17 is a flowchart of a method of wireless communication at a first wireless device, in accordance with the teachings disclosed herein.

FIG. 17 is a flowchart 1700 of a method of wireless communication. The method may be performed by a first wireless device, such as a UE (e.g., the UE 104, the first wireless communication device 310, and/or an apparatus 1902 of FIG. 19). The method may facilitate improving sidelink communications by enabling a wireless device to perform resource reservation when applying a power saving mode.

At 1702, the first wireless device may apply a power saving mode for the sidelink communication, the power saving mode including one or more periodic on-durations, as described in connection with 1112 of FIG. 11. The applying of the power saving mode, at 1702, may be performed by a power saving mode component 1944 of the apparatus 1902 of FIG. 19.

In some examples, the power saving mode may include one or more periodic on-durations, such as the example first on-duration 802, the third on-duration 806, and the fifth on-duration 810 of FIG. 8A. In some examples, the periodic on-durations for the first wireless device are based on a common on and off pattern for a wireless communication system, and the common on and off pattern may be common to the first wireless device and the second wireless device. In some examples, the power saving mode may be based on a DRX mode. In some examples, the power saving mode may be based on a partial sensing mode.

At 1706, the first wireless device receives SCI indicating a sidelink resource reservation for a second wireless device, the SCI indicating one or more slots of the sidelink resource reservation, as described in connection with sidelink resource reservation indication 1118 of FIG. 11. The receiving of the SCI indicating the sidelink resource reservation for a second wireless device, at 1706, may be performed by an SCI component 1940 of the apparatus 1902 of FIG. 19.

At 1708, the first wireless device maps the one or more slots to one or more physical slots based on periodic on-durations of a power saving mode for sidelink communication, as described in connection with 1120 of FIG. 11. The mapping of the one or more slots to physical slots, at 1708, may be performed by a mapping component 1942 of the apparatus 1902 of FIG. 19.

In some examples, the SCI (e.g., at 1706) may indicate the sidelink resource reservation based on a set of contiguous logical slots comprising a concatenation of slots (e.g., sets of slots) from the periodic on-durations of the power saving mode, as described in connection with the first logical slot resource pool 1020 and/or the second logical slot resource pool 1030 of FIG. 10. For example, the set of contiguous logical slots may be based on a mapping of physical slots excluding off-durations of the power saving mode.

In some examples, at 1710, the first wireless device may determine one or more physical slots to which the sidelink resource reservation corresponds based on a mapping of the set of contiguous logical slots to the one or more physical slots, as described in connection with the resource pool 1000 and the first logical slot resource pool 1020 and/or the second logical slot resource pool 1030 of FIG. 10. The determining of the one or more physical slots based on the mapping of the set of contiguous logical slots, at 1710, may be performed by a physical slot component 1946 of the apparatus 1902 of FIG. 19.

In some examples, the SCI may indicate the sidelink resource reservation in a unit based on a number of logical slots. For example, the SCI may indicate a period of 100 ms as 15 logical slots.

In some examples, the sidelink resource reservation may be based on a first resource pool for the power saving mode, such as the first logical slot resource pool 1020 and/or the second logical slot resource pool 1030 of FIG. 10.

At 1704, the first wireless device may configure, via a configuration parameter, to determine the sidelink resource reservation based on a logical slot or a physical slot, as described in connection with 1120 of FIG. 11. The configuring to determine the sidelink resource reservation, at 1704, may be performed by a configuration component 1948 of the apparatus 1902 of FIG. 19.

In some examples, the first wireless device may be provided the configuration parameter when applying the power saving mode (e.g., at 1702). In some examples, the configuration parameter may be indicated by a resource pool used by the first wireless device for the sidelink communication, such as the indication 1050 of FIG. 10.

Figure 18:
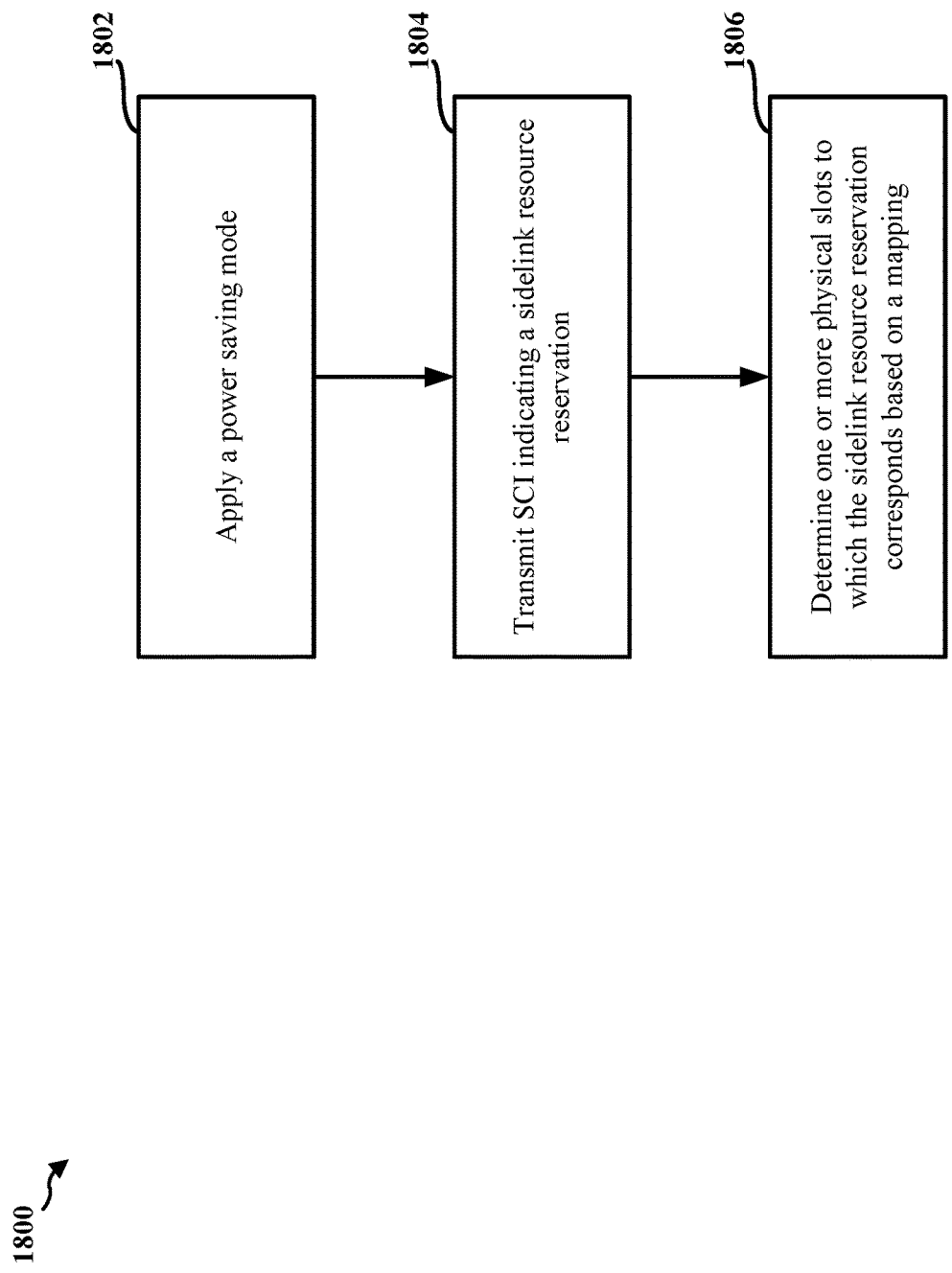
FIG. 18 is a flowchart of a method of wireless communication at a first wireless device, in accordance with the teachings disclosed herein.

FIG. 18 is a flowchart 1800 of a method of wireless communication. The method may be performed by a first wireless device, such as a UE (e.g., the UE 104, the first wireless communication device 310, and/or an apparatus 1902 of FIG. 19). The method may facilitate improving sidelink communications by enabling a wireless device to perform resource reservation when applying a power saving mode.

At 1802, the first wireless device applies a power saving mode for sidelink communication, as described in connection with 1112 of FIG. 11. For example, the applying of the power saving mode may be performed by the power saving mode component 1944 of the apparatus 1902 of FIG. 19. In some examples, the power saving mode may be based on a partial sensing mode. In some examples, the power saving mode may be based on DRX.

The power saving mode may include periodic on-durations. For example, the power saving mode may include periodic on-durations corresponding to the first set of slots 1002, the third set of slots 1006, and the fifth set of slots 1010 of the resource pool 1000 of FIG. 10.

At 1804, the first wireless device receives SCI indicating a sidelink resource reservation, as described in connection with the sidelink resource reservation indication 1118 of FIG. 11. For example, the receiving of the SCI indicating the sidelink resource reservation may be performed by the SCI component 1940 of the apparatus 1902 of FIG. 19. The sidelink resource reservation may be for a second wireless device that indicates one or more slots based on the periodic on-durations of the power saving mode.

In some examples, the SCI may indicate the sidelink resource reservation based on a set of contiguous logical slots comprising a concatenation of sets of slots from the periodic on-durations of the power saving mode, as described in connection with the first logical slot resource pool 1020 and/or the second logical slot resource pool 1030 of FIG. 10. In some examples, the set of contiguous logical slots may be based on a mapping to physical slots excluding periodic off-durations of the power saving mode. In some examples, the SCI may indicate the sidelink resource reservation in a unit based on a number of logical slots.

At 1806, the first wireless device may determine one or more physical slots to which the sidelink resource reservation corresponds based on a mapping, as described in connection with 1120 of FIG. 11. For example, the determining of the one or more physical slots may be performed by the mapping component 1942 of the apparatus 1902 of FIG. 19. In some examples, the SCI may indicate the sidelink resource reservation in a unit based on a number of logical slots. For example, the SCI may indicate a period of 100 ms based on a number of logical slots corresponding to the period (e.g., 15 logical slots).

In some examples, the sidelink resource reservation may be based on a first resource pool for the power saving mode. In some examples, the periodic on-durations for the first wireless device may be based on a common on and off pattern for a wires communication system. In some examples, the common on and off pattern may be common to the first wireless device and the second wireless device.

In some examples, the first wireless device may be configured, via a configuration parameter, to determine the sidelink resource reservation based on a logical slot or a physical slot. In some examples, the configuration parameter may be provided when the first wireless device applies the power saving mode. In some examples, the configuration parameter may be indicated by a resource pool used by the first wireless device for sidelink communication, such as the example indication 1050 of the resource pool 1000 of FIG. 10.

Figure 19:
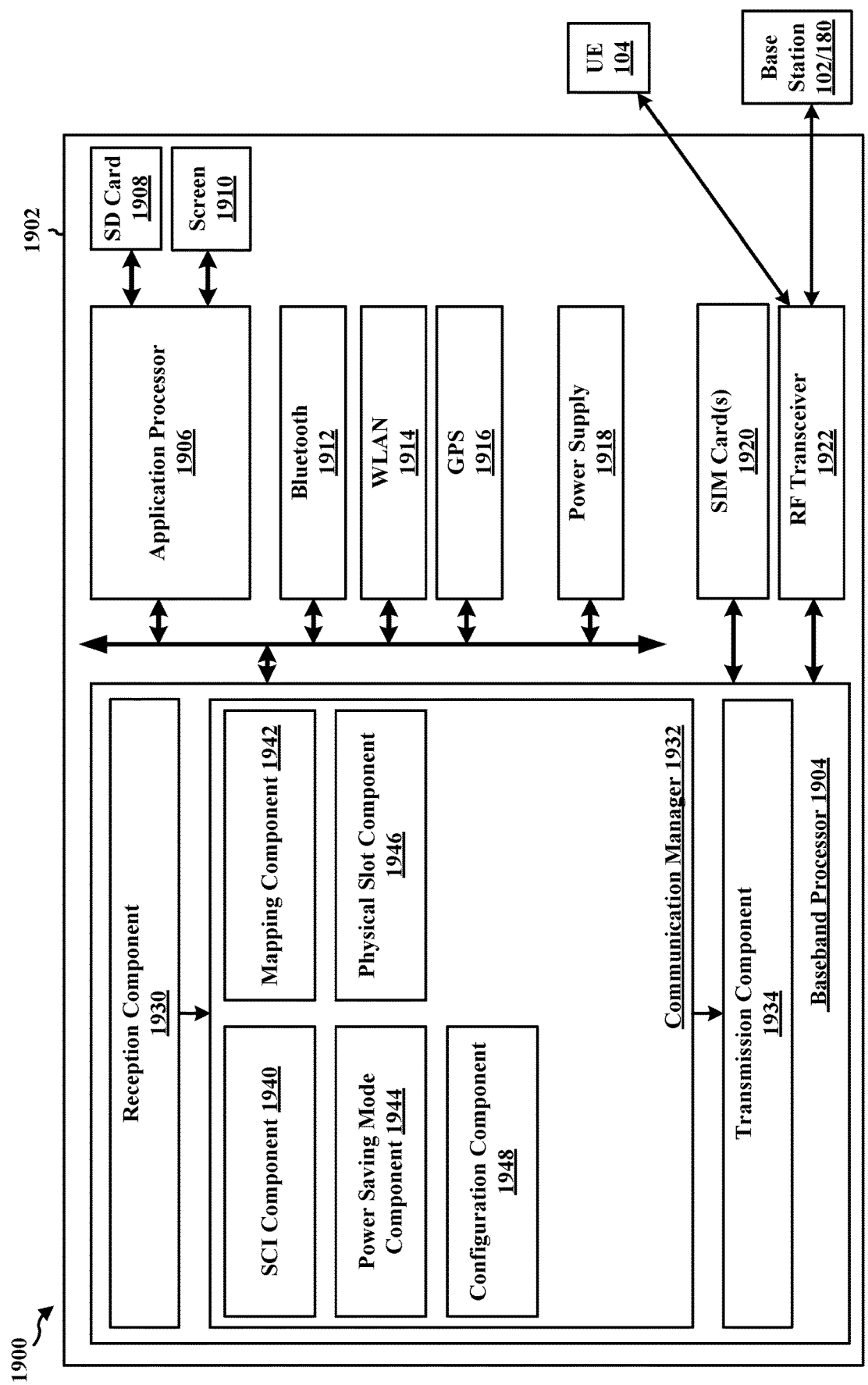
FIG. 19 is a diagram illustrating an example of a hardware implementation for an example apparatus, in accordance with the teachings disclosed herein.

FIG. 19 is a diagram 1900 illustrating an example of a hardware implementation for an apparatus 1902. The apparatus 1902 may be a UE, or another device configured to transmit and/or receive sidelink communication. The apparatus 1902 includes a baseband processor 1904 (also referred to as a modem) coupled to a RF transceiver 1922. In some aspects, the baseband processor 1904 may be a cellular baseband processor and/or the RF transceiver 1922 may be a cellular RF transceiver. The apparatus 1902 may further include one or more subscriber identity modules (SIM) cards 1920, an application processor 1906 coupled to a secure digital (SD) card 1908 and a screen 1910, a Bluetooth module 1912, a wireless local area network (WLAN) module 1914, a Global Positioning System (GPS) module 1916, and/or a power supply 1918. The baseband processor 1904 communicates through the RF transceiver 1922 with the UE 104 and/or the base station 102/180. The baseband processor 1904 may include a computer-readable medium/memory. The computer-readable medium/memory may be non-transitory. The baseband processor 1904 is responsible for general processing, including the execution of software stored on the computer-readable medium/memory. The software, when executed by the baseband processor 1904, causes the baseband processor 1904 to perform the various functions described in the present application. The computer-readable medium/memory may also be used for storing data that is manipulated by the baseband processor 1904 when executing software. The baseband processor 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the baseband processor 1904. The baseband processor 1904 may be a component of the first wireless communication device 310 and may include the memory 376 and/or at least one of the TX processor 316, the RX processor 370, and the controller/processor 375. In one configuration, the apparatus 1902 may be a modem chip and include just the baseband processor 1904, and in another configuration, the apparatus 1902 may be the entire UE (e.g., see the first wireless communication device 310 of FIG. 3) and include the additional modules of the apparatus 1902.

The communication manager 1932 includes an SCI component 1940 that is configured to receive SCI indicating a sidelink resource reservation for a second wireless device, the SCI indicating one or more slots of the sidelink resource reservation, for example, as described in connection with 1602 of FIG. 16 and/or 1706 of FIG. 17. The example SCI component 1940 may also be configured to receive SCI indicating a sidelink resource reservation, for example, as described in connection with 1804 of FIG. 18.

The communication manager 1932 also includes a mapping component 1942 that is configured to map the one or more slots to physical slots based on periodic on-durations of a power saving mode for sidelink communication, for example, as described in connection with 1604 of FIG. 16 and/or 1708 of FIG. 17. The example mapping component 1942 may also be configured to determine one or more physical slots to which the sidelink resource reservation corresponds based on a mapping, for example, as described in connection with 1806 of FIG. 18.

The communication manager 1932 also includes a power saving mode component 1944 that is configured to apply a power saving mode for the sidelink communication, for example, as described in connection with 1702 of FIG. 17. The example power saving mode component 1944 may also be configured to apply a power saving mode for sidelink communication, for example, as described in connection with 1802 of FIG. 18.

The communication manager 1932 also includes a physical slot component 1946 that is configured to determine one or more physical slots to which the sidelink resource reservation corresponds based on a mapping of the set of contiguous logical slots to the one or more physical slots, for example, as described in connection with 1710 of FIG. 17.

The communication manager 1932 also includes a configuration component 1948 that is configured to configure, via a configuration parameter, to determine the sidelink resource reservation based on a logical slot or a physical slot, for example, as described in connection with 1704 of FIG. 17.

The apparatus may include additional components that perform each of the blocks of the algorithm in the flowcharts of FIGS. 16, 17, and/or 18. As such, each block in the flowcharts of FIGS. 16, 17, and/or 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1902 may include a variety of components configured for various functions. In one configuration, the apparatus 1902, and in particular the baseband processor 1904, includes means for receiving SCI indicating a sidelink resource reservation for a second wireless device, the SCI indicating one or more slots of the sidelink resource reservation. The example apparatus 1902 also includes means for mapping the one or more slots to physical slots based on periodic on-durations of a power saving mode for sidelink communication.

In another configuration, the example apparatus 1902 also includes means for applying the power saving mode for the sidelink communication, the power saving mode including one or more periodic on-durations.

In another configuration, the example apparatus 1902 also includes means for determining one or more physical slots to which the sidelink resource reservation corresponds based on a mapping of the set of contiguous logical slots to the one or more physical slots.

In another configuration, the example apparatus 1902 also includes means for being configured, via a configuration parameter, to determine the sidelink resource reservation based on a logical slot or a physical slot.

In one configuration, the apparatus 1902, and in particular the baseband processor 1904, includes means for applying a power saving mode for sidelink communication, the power saving mode having periodic on-durations. The example apparatus 1902 also includes means for receiving SCI indicating a sidelink resource reservation for a second wireless device that indicates one or more slots based on the periodic on-durations of the power saving mode. The example apparatus 1902 may also include means for determining one or more physical slots to which the sidelink resource reservation corresponds based on a mapping of the contiguous logical slots to the one or more physical slots.

The means may be one or more of the components of the apparatus 1902 configured to perform the functions recited by the means. As described supra, the apparatus 1902 may include the TX processor 316, the RX processor 370, and the controller/processor 375. As such, in one configuration, the means may be the TX processor 316, the RX processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a wireless device including at least one processor coupled to a memory and configured to: map one or more slots of a sidelink resource reservation to physical slots based on periodic on-durations of a power saving mode for sidelink communication; and transmit SCI indicating the sidelink resource reservation of the one or more slots.

Aspect 2 is the apparatus of aspect 1, further including that the memory and the at least one processor are further configured to: apply the power saving mode for the sidelink communication.

Aspect 3 is the apparatus of any of aspects 1 and 2, further including that the power saving mode is based on DRX.

Aspect 4 is the apparatus of any of aspects 1 to 3, further including that the SCI indicates the sidelink resource reservation based on a set of contiguous logical slots comprising a concatenation of sets of slots from the periodic on-durations of the power saving mode.

Aspect 5 is the apparatus of any of aspects 1 to 4, further including that the set of contiguous logical slots is based on a mapping to physical slots excluding periodic off-durations of the power saving mode.

Aspect 6 is the apparatus of any of aspects 1 to 5, further including that the SCI indicates the sidelink resource reservation in a unit based on a number of logical slots.

Aspect 7 is the apparatus of any of aspects 1 to 6, further including that the sidelink resource reservation indicates the one or more slots based on the periodic on-durations of the power saving mode when the sidelink resource reservation is based on a first resource pool for the power saving mode.

Aspect 8 is the apparatus of any of aspects 1 to 7, further including that the memory and the at least one processor are configured to: indicate a second sidelink resource reservation from a second resource pool that is unexclusive to the power saving mode, the second sidelink resource reservation being based on physical slots that include the periodic on-durations and at least one periodic off-duration of the power saving mode.

Aspect 9 is the apparatus of any of aspects 1 to 8, further including that the periodic on-durations for the wireless device are based on a common on and off pattern for a wireless communication system.

Aspect 10 is the apparatus of any of aspects 1 to 9, further including that the memory and the at least one processor are configured to: determine, based on a configuration parameter, the sidelink resource reservation based on a logical slot or a physical slot.

Aspect 11 is the apparatus of any of aspects 1 to 10, further including that the configuration parameter is provided when applying the power saving mode.

Aspect 12 is the apparatus of any of aspects 1 to 11, further including that the configuration parameter is indicated by a resource pool used by the wireless device for the sidelink communication.

Aspect 13 is the apparatus of any of aspects 1 to 12, further including that the power saving mode is based on a partial sensing mode.

Aspect 14 is the apparatus of any of aspects 1 to 13 further comprising at least one an antenna or a transceiver.

Aspect 15 is a method of wireless communication for implementing any of aspects 1 to 13.

Aspect 16 is an apparatus for wireless communication including means for implementing any of aspects 1 to 13.

Aspect 17 is the apparatus of any of aspect 16 further comprising at least one an antenna or a transceiver.

Aspect 18 is a non-transitory computer-readable storage medium storing computer executable code, where the code, when executed, causes a processor to implement any of aspects 1 to 13.

Aspect 19 is an apparatus for wireless communication at a first wireless device including at least one processor coupled to a memory and configured to: receive SCI indicating a sidelink resource reservation for a second wireless device, the SCI indicating one or more slots of the sidelink resource reservation; and map the one or more slots indicated in the sidelink resource reservation to one or more physical slots based on periodic on-durations of a power saving mode for sidelink communication.

Aspect 20 is the apparatus of aspect 19, further including that the memory and the at least one processor are further configured to: apply the power saving mode for the sidelink communication.

Aspect 21 is the apparatus of any of aspects 19 and 20, further including that the power saving mode is based on DRX.

Aspect 22 is the apparatus of any of aspects 19 to 21, further including that the SCI indicates the sidelink resource reservation based on a set of contiguous logical slots comprising a concatenation of slots during the periodic on-durations of the power saving mode.

Aspect 23 is the apparatus of any of aspects 19 to 22, further including that the set of contiguous logical slots is based on a mapping to physical slots excluding periodic off-durations of the power saving mode.

Aspect 24 is the apparatus of any of aspects 19 to 23, further including that the memory and the at least one processor are further configured to: determine the one or more physical slots corresponding to the one or more slots indicated in the sidelink resource reservation based on a mapping of the set of contiguous logical slots to the one or more physical slots.

Aspect 25 is the apparatus of any of aspects 19 to 24, further including that the SCI indicates the sidelink resource reservation in a unit based on a number of logical slots.

Aspect 26 is the apparatus of any of aspects 19 to 25, further including that the sidelink resource reservation is based on a first resource pool for the power saving mode.

Aspect 27 is the apparatus of any of aspects 19 to 26, further including that the periodic on-durations for the first wireless device are based on a common on and off pattern for a wireless communication system, the common on and off pattern being common to the first wireless device and the second wireless device.

Aspect 28 is the apparatus of any of aspects 19 to 27, further including that the memory and the at least one processor are configured to: determine, based on a configuration parameter, the sidelink resource reservation based on a logical slot or a physical slot.

Aspect 29 is the apparatus of any of aspects 19 to 28, further including that the configuration parameter is provided when applying the power saving mode.

Aspect 30 is the apparatus of any of aspects 19 to 29, further including that the configuration parameter is indicated by a resource pool used by the first wireless device for the sidelink communication.

Aspect 31 is the apparatus of any of aspects 19 to 30, further including that the power saving mode is based on a partial sensing mode.

Aspect 32 is the apparatus of any of aspects 19 to 31 further comprising at least one an antenna or a transceiver.

Aspect 33 is a method of wireless communication for implementing any of aspects 19 to 31.

Aspect 34 is an apparatus for wireless communication including means for implementing any of aspects 19 to 31.

Aspect 35 is the apparatus of aspect 34 further comprising at least one an antenna or a transceiver.

Aspect 36 is a non-transitory computer-readable storage medium storing computer executable code, where the code, when executed, causes a processor to implement any of aspects 19 to 31.

Aspect 37 is a method of wireless communication at a wireless device, comprising: applying a power saving mode for sidelink communication, the power saving mode having periodic on-durations; and transmitting SCI indicating a sidelink resource reservation that indicates one or more slots based on the periodic on-durations of the power saving mode.

In Aspect 38, the method of Aspect 37 further includes that the power saving mode is based on a partial sensing mode.

In Aspect 39, the method of any of Aspect 37 or Aspect 38 further includes that the power saving mode is based on DRX.

In Aspect 40, the method of any of Aspects 37 to 39 further includes that the SCI indicates the sidelink resource reservation based on a set of contiguous logical slots comprising a concatenation of sets of slots from the periodic on-durations of the power saving mode.

In Aspect 41, the method of any of Aspects 37 to 40 further includes that the set of contiguous logical slots are based on a mapping to physical slots excluding periodic off-durations of the power saving mode.

In Aspect 42, the method of any of Aspects 37 to 41 further includes that the SCI indicates the sidelink resource reservation in a unit based on a number of logical slots.

In Aspect 43, the method of any of Aspects 37 to 42 further includes that the sidelink resource reservation indicates the one or more slots based on the periodic on-durations of the power saving mode if the sidelink resource reservation is based on a first resource pool for the power saving mode.

In Aspect 44, the method of any of Aspects 37 to 43 further includes that the wireless device indicates other sidelink resource reservations from a second resource pool that is not exclusive to the power saving mode by indicating a reservation based on physical slots that include the periodic on-duration and a periodic off-duration of the power saving mode.

In Aspect 45, the method of any of Aspects 37 to 44 further includes that the periodic on-durations for the wireless device are based on a common on and off pattern for a wireless communication system.

In Aspect 46, the method of any of Aspects 37 to 45 further includes that the wireless device is configured, via a configuration parameter, to determine the sidelink resource reservation based on a logical slot or a physical slot.

In Aspect 47, the method of any of Aspects 37 to 46 further includes that the configuration parameter is provided when applying the power saving mode.

In Aspect 48, the method of any of Aspects 37 to 47 further includes that the configuration parameter is indicated by a resource pool used by the wireless device for sidelink communication.

Aspect 49 is a device including one or more processors and one or more memories in electronic communication with the one or more processors storing instructions executable by the one or more processors to cause a system or an apparatus to implement a method as in any of Aspects 37 to 48.

Aspect 50 is a system or apparatus including means for implementing a method or realizing an apparatus as in any of Aspects 37 to 48.

Aspect 51 is a non-transitory computer-readable medium storing instructions executable by one or more processors to cause the one or more processors to implement a method as in any of Aspects 37 to 48.

Aspect 52 is a method of wireless communication at a first wireless device, comprising: applying a power saving mode for sidelink communication, the power saving mode having periodic on-durations; and receiving SCI indicating a sidelink resource reservation for a second wireless device that indicates one or more slots based on the periodic on-durations of the power saving mode.

In Aspect 53, the method of Aspect 52 further includes that the power saving mode is based on a partial sensing mode.

In Aspect 54, the method of any of Aspect 52 or Aspect 53 further includes that the power saving mode is based on DRX.

In Aspect 55, the method of any of Aspects 52 to 54 further includes that the SCI indicates the sidelink resource reservation based on a set of contiguous logical slots comprising a concatenation of sets of slots from the periodic on-durations of the power saving mode.

In Aspect 56, the method of any of Aspects 52 to 55 further includes that the set of contiguous logical slots are based on a mapping to physical slots excluding periodic off-durations of the power saving mode.

In Aspect 57, the method of any of Aspects 52 to 56 further includes determining one or more physical slots to which the sidelink resource reservation corresponds based on a mapping of the contiguous logical slots to the one or more physical slots.

In Aspect 58, the method of any of Aspects 52 to 57 further includes that the SCI indicates the sidelink resource reservation in a unit based on a number of logical slots.

In Aspect 59, the method of any of Aspects 52 to 58 further includes that the sidelink resource reservation is based on a first resource pool for the power saving mode.

In Aspect 60, the method of any of Aspects 52 to 59 further includes that the periodic on-durations for the first wireless device are based on a common on and off pattern for a wireless communication system.

In Aspect 61, the method of any of Aspects 52 to 60 further includes that the common on and off pattern is common to the first wireless device and the second wireless device.

In Aspect 62, the method of any of Aspects 52 to 61 further includes that the first wireless device is configured, via a configuration parameter, to determine the sidelink resource reservation based on a logical slot or a physical slot.

In Aspect 63, the method of any of Aspects 52 to 62 further includes that the configuration parameter is provided when applying the power saving mode.

In Aspect 64, the method of any of Aspects 52 to 63 further includes that the configuration parameter is indicated by a resource pool used by the first wireless device for sidelink communication.

Aspect 65 is a device including one or more processors and one or more memories in electronic communication with the one or more processors storing instructions executable by the one or more processors to cause a system or an apparatus to implement a method as in any of Aspects 52 to 64.

Aspect 66 is a system or apparatus including means for implementing a method or realizing an apparatus as in any of Aspects 52 to 64.

Aspect 67 is a non-transitory computer-readable medium storing instructions executable by one or more processors to cause the one or more processors to implement a method as in any of Aspects 52 to 64.

What is claimed is:

1. An apparatus for wireless communication at a wireless device, comprising:
   one or more memories; and
   one or more processors coupled to the one or more memories, the one or more processors configured to cause the wireless device to:
   concatenate multiple physical slots associated with periodic on-durations of a power saving mode for sidelink communication to form a logical slot resource pool comprising one or more logical slots;
   map the one or more logical slots of the logical slot resource pool to one or more physical slots of a sidelink resource reservation; and
   transmit sidelink control information (SCI) that indicates the sidelink resource reservation, wherein the SCI includes an indication of the sidelink resource reservation that uses one or more logical slot indices of the one or more logical slots, and wherein the indication is based on the mapping.

2. The apparatus of claim 1, further comprising:
   one or more antennas coupled to the one or more processors, wherein the one or more processors are further configured to cause the wireless device to:
   apply the power saving mode for the sidelink communication.

3. The apparatus of claim 1, wherein the power saving mode is based on discontinuous reception (DRX).

4. The apparatus of claim 1, wherein the indication included in the SCI indicates the sidelink resource reservation based on the one or more logical slots, wherein the one or more logical slots comprise a set of contiguous logical slots associated with [the] one or more periodic on-durations of the power saving mode.

5. The apparatus of claim 4, wherein the set of contiguous logical slots excludes a periodic off-duration of the power saving mode.

6. The apparatus of claim 4, wherein the indication included in the SCI indicates the sidelink resource reservation in a unit based on a number of logical slots.

7. The apparatus of claim 1, wherein the sidelink resource reservation indicates the one or more physical slots based on one or more periodic on-durations of the power saving mode when the sidelink resource reservation is based on a resource pool for the power saving mode.

8. The apparatus of claim 1, wherein the one or more processors are further configured to cause the wireless device to:
indicate a second sidelink resource reservation from a resource pool that is shared with at least one wireless device not configured with the power saving mode, wherein the second sidelink resource reservation is based on the one or more physical slots associated with one or more periodic on-durations and at least one periodic off-duration of the power saving mode.

9. The apparatus of claim 1, wherein the periodic on-durations for the wireless device are based on a common on and off pattern for a wireless communication system.

10. The apparatus of claim 1, wherein the one or more processors are further configured to cause the wireless device to:
determine, based on a configuration parameter, the sidelink resource reservation based on a logical slot or a physical slot.

11. The apparatus of claim 10, wherein the configuration parameter is provided when the power saving mode is applied.

12. The apparatus of claim 10, wherein the configuration parameter is indicated by a resource pool used by the wireless device for the sidelink communication.

13. The apparatus of claim 1, wherein the power saving mode is based on a partial sensing mode.

14. The apparatus of claim 1, wherein the one or more processors are configured, individually or in combination, to concatenate the one or more physical slots, map the one or more logical slots of the logical slot resource pool to the one or more physical slots, and transmit the SCI that indicates the sidelink resource reservation.

15. A method of wireless communication at a wireless device, comprising:
concatenating multiple physical slots associated with periodic on-durations of a power saving mode for sidelink communication to form a logical slot resource pool comprising one or more logical slots;
mapping the one or more logical slots of the logical slot resource pool to one or more physical slots of a sidelink resource reservation; and
transmitting sidelink control information (SCI) indicating the sidelink resource reservation, wherein the SCI includes an indication of the sidelink resource reservation using one or more logical slot indices of the one or more logical slots, and wherein the indication is based on the mapping.

16. The method of claim 15, further comprising:
applying the power saving mode for the sidelink communication, the power saving mode including the periodic on-durations.

17. An apparatus for wireless communication at a first wireless device, comprising:
one or more memories; and
one or more processors coupled to the one or more memories, the one or more processors configured to cause the first wireless device to:
receive sidelink control information (SCI) that indicates a sidelink resource reservation for a second wireless device, wherein the SCI includes an indication of the sidelink resource reservation that uses one or more logical slot indices of one or more logical slots of a logical slot resource pool, and wherein the indication is based on a mapping of the one or more logical slots of the logical slot resource pool to one or more physical slots associated with one or more periodic on-durations of a power saving mode for sidelink communication; and
determine the one or more physical slots based on the SCI.

18. The apparatus of claim 17, further comprising:
one or more antennas coupled to the one or more processors, wherein the one or more processors are further configured to cause the first wireless device to:
apply the power saving mode for the sidelink communication, the power saving mode including the one or more periodic on-durations.

19. The apparatus of claim 17, wherein the power saving mode is based on discontinuous reception (DRX).

20. The apparatus of claim 17, wherein the indication included in the SCI indicates the sidelink resource reservation based on the one or more logical slots, wherein the one or more logical slots comprise a set of contiguous logical slots associated with the one or more periodic on-durations of the power saving mode.

21. The apparatus of claim 20, wherein the set of contiguous logical slots excludes a periodic off-duration of the power saving mode.

22. The apparatus of claim 20, wherein to determine the one or more physical slots based on the SCI, the one or more processors are configured to cause the first wireless device to: determine the one or more physical slots based on the mapping.

23. The apparatus of claim 20, wherein the indication included in the SCI indicates the sidelink resource reservation in a unit based on a number of logical slots.

24. The apparatus of claim 17, wherein the sidelink resource reservation is based on a resource pool for the power saving mode.

25. The apparatus of claim 17, wherein the one or more periodic on-durations for the first wireless device are based on a common on and off pattern for a wireless communication system, and wherein the common on and off pattern is common to the first wireless device and the second wireless device.

26. The apparatus of claim 17, wherein the one or more processors are further configured to cause the first wireless device to:
determine, based on a configuration parameter, the sidelink resource reservation based on a logical slot or a physical slot.

27. The apparatus of claim 26, wherein the configuration parameter is provided when the power saving mode is applied.

28. The apparatus of claim 26, wherein the configuration parameter is indicated by a resource pool used by the first wireless device for the sidelink communication.

29. The apparatus of claim 17, wherein the power saving mode is based on a partial sensing mode.

30. The apparatus of claim 17, wherein the one or more processors are configured, individually or in combination, to receive the SCI that indicates the sidelink resource reservation for the second wireless device and determine the one or more physical slots based on the SCI.

31. A method of wireless communication at a first wireless device, comprising:
receiving sidelink control information (SCI) indicating a sidelink resource reservation for a second wireless device, wherein the SCI includes an indication of the sidelink resource reservation using one or more logical slot indices of one or more logical slots of a logical slot resource pool, and wherein the indication is based on a mapping of the one or more logical slots of the logical slot resource pool to one or more physical slots associated with one or more periodic on-durations of a power saving mode for sidelink communication; and
determine the one or more physical slots based on the SCI.

32. The method of claim 31, further comprising:
applying the power saving mode for the sidelink communication, the power saving mode including the one or more periodic on-durations.

33. A non-transitory computer-readable storage medium storing computer executable code, wherein the code, when executed by one or more processors of a wireless device, cause the wireless device to:
concatenate multiple physical slots associated with periodic on-durations of a power saving mode for sidelink communication to form a logical slot resource pool comprising one or more logical slots;
map the one or more logical slots of the logical slot resource pool to one or more physical slots of a sidelink resource reservation; and
transmit sidelink control information (SCI) indicating the sidelink resource reservation, wherein the SCI includes an indication of the sidelink resource reservation using one or more logical slot indices of the one or more logical slots, and wherein the indication is based on the mapping.

34. A non-transitory computer-readable storage medium storing computer executable code, wherein the code, when executed by one or more processors of a first wireless device, cause the first wireless device to:
receive sidelink control information (SCI) indicating a sidelink resource reservation for a second wireless device, wherein the SCI includes an indication of the sidelink resource reservation using one or more logical slot indices of one or more logical slots of a logical slot resource pool, and wherein the indication is based on a mapping of the one or more logical slots of the logical slot resource pool to one or more physical slots associated with one or more periodic on-durations of a power saving mode for sidelink communication; and
determine the one or more physical slots based on the SCI.

* * * * *